(12) United States Patent
Kakutani

(10) Patent No.: US 6,382,757 B1
(45) Date of Patent: May 7, 2002

(54) PRINTER, METHOD OF PRINTING, AND RECORDING MEDIUM FOR IMPLEMENTING THE METHOD

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/323,549

(22) Filed: Jun. 1, 1999

(30) Foreign Application Priority Data

Jun. 2, 1998 (JP) .......................................... 10-170634

(51) Int. Cl.[7] ................................................ B41J 2/205
(52) U.S. Cl. .......................................... 347/15; 347/43
(58) Field of Search ...................... 347/15, 43; 358/298

(56) References Cited

U.S. PATENT DOCUMENTS

| | | | |
|---|---|---|---|
| 4,394,662 A | * 7/1983 | Yoshida et al. | ........... 346/33 R |
| 4,860,026 A | * 8/1989 | Matsumoto et al. | .......... 347/15 |
| 5,868,505 A | * 2/1999 | Narushima et al. | .... 400/120.09 |
| 6,130,686 A | * 10/2000 | Danzuka et al. | .............. 347/43 |

FOREIGN PATENT DOCUMENTS

| | | |
|---|---|---|
| EP | 0 636 482 | 2/1995 |
| EP | 0 679 011 | 10/1995 |
| EP | 0 750 995 | 1/1997 |
| EP | 0 779 159 | 6/1997 |
| JP | 59-201864 | 11/1984 |

OTHER PUBLICATIONS

Patent Abstracts of Japan, vol. 097, No. 011, Nov. 28, 1997, JP 09 183238, Jul. 15, 1997.

* cited by examiner

*Primary Examiner*—Craig A. Hallacher
(74) *Attorney, Agent, or Firm*—Oblon, Spivak, McClelland, Maier & Neustadt, P.C.

(57) ABSTRACT

In a known printer that may create different types of dots having different densities or different ink quantities, there is a problem that the types of dots to be created in the respective pixels included in an image are not determined by taking into account the restriction of ink duty. A printer of the present invention has a head that provides two inks of different densities, that is, a higher-density ink and a lower-density ink, with respect to at least one hue, and may create dots of different ink quantities. The technique of the present invention provides a table that stores expected quantities of inks to be spouted for respective color components of image data corresponding to tone values regarding the respective color components of the image data. The technique refers to the table and sets an expected quantity of ink to be spouted for each color component in each pixel based on input image data, in order to keep the restriction of ink duty. The technique then carries out a multi-valuing process for each color component and determines creation or non-creation of the respective types of dots having different ink quantities, so as to make the quantity of ink actually spouted in each pixel closed to the expected quantity of ink. This arrangement enables the different types of dots having different densities or different ink quantities to be created appropriately, while keeping the restriction of ink duty.

24 Claims, 20 Drawing Sheets

DATA OF EXPECTED QUANTITY OF INK Cd

DITHER TABLE

ON/OFF STATE OF SMALL DOTS

PRINTER, METHOD OF PRINTING, AND RECORDING MEDIUM FOR IMPLEMENTING THE METHOD

BACKGROUND OF THE INVENTION

1. Field of the Invention

The present invention relates to a printer having a head, which provides inks of different densities with respect to at least one hue and may create at least two different types of dots having different ink quantities with respect to each of the different density inks, and enabling a multi-tone image to be printed with inks spouted from the head. The present invention also pertains to a method of printing as well as a recording medium for implementing the method.

2. Description of the Related Art

Color printers that spout multiple colors of inks from a head are widely used as an output device of a computer, which prints images processed by the computer in a multi-color, multi-tone manner. In order to further improve the printing quality in an area of low image density, that is, a highlighted area, a printer and a printing method using higher density and lower density inks have been proposed. This technique provides both a higher density ink and a lower density ink for an identical hue and controls the spout of these inks, so as to attain printing of the excellent tone expression.

Another proposed printer for multi-tone expression creates two different types of dots having different ink densities and ink quantities and thereby changes the density per unit area in multiple stages (for example, JAPANESE PATENT LAID-OPEN GAZETTE No. 59-201864). In this printer, one pixel consists of four dots. The technique applied to this printer changes the frequency of appearance of the higher-density dots and the lower-density dots in the pixels and thereby enables an image to be printed with multiple densities.

In the printer that spouts ink and creates dots, the quantity of ink per unit area, that is, the ink duty, should be controlled not to exceed a preset level, which depends upon the type of printing paper. The spout of ink exceeding this preset level causes the printing paper to be readily broken and makes ink stains on the printing paper, thereby lowering the picture quality of resulting printed images.

In the prior art printer that enables creation of two different types of dots having different ink densities and ink quantities, there is no specific consideration for the ink duty. The prior art printer simply creates these two different types of dots according to the input tones of the respective pixels based on a preset pattern, and does not take into account the restriction of ink duty nor attain the well-balanced regulation of the quantities of inks having different densities to create the different types of dots.

SUMMARY OF THE INVENTION

The object of the present invention is thus to provide a technique applicable to a printer, which enables at least two different types of dots having different ink densities and ink quantities to be utilized effectively when there is a requirement in regulation of the ink quantities for dot creation, for example, when there is a restriction of ink duty.

At least part of the above and the other related objects is attained by a printer that creates a plurality of dots and thereby prints an image on a printing medium. The printer includes: an input unit that inputs image data for each of pixels included in an original image; a head that provides a plurality of inks, which include at least two inks of different densities with respect to at least one hue, and enables creation of at least two different types of dots having different quantities of ink for each of the plurality of inks; an expected ink quantity setting unit that sets an expected quantity of ink, which is to be spouted for creation of a dot, in each pixel based on the image data, with respect to each of the plurality of inks; a multi-valuing unit that sets an on-off state of each of the at least two different types of dots in each pixel, based on the expected quantity of ink, with respect to each of the plurality of inks; and a dot creation unit that creates dots set in the on state.

In the printer of the present invention, the technique sets the expected quantity of ink used for creation of a dot in each pixel, with respect to each of a plurality of inks, which include at least two inks having different densities provided for at least one hue, and determines the type of the dot to be created in each pixel. This arrangement enables the quantities of ink used for creation of dots to be regulated appropriately.

The expected quantity of ink here represents an ideal quantity of ink to be spouted in each pixel for expression of the tone value included in the input image data. In the printer of the present invention, the quantities of ink used for creation of dots are practically restricted to several values. The expected quantities of ink are, however, not restricted to these several values but may take any continuous values in a specific range. Although the expected value is a term generally used in the field of probability, the term 'expected value or quantity' in this specification means a value or quantity of ink expected to spout in each pixel.

The expected quantity of ink may not coincide with a quantity of ink actually required for expressing the tone value of the image data but may be determined by taking into account the characteristics of the nozzles, from which ink is spouted, and other related factors. The expected quantity of ink may be greater than or less than the quantity of ink actually required for expressing the tone value of the image data. By way of example, the expected quantity of ink may be set greater for some tone values and set smaller for other tone values.

In accordance with one preferable application of the printer, the image data includes tone values with respect to at least one color component in a color space. The expected ink quantity setting unit includes: an expected values storage unit that stores expected quantities of inks corresponding to combinations of tone values regarding a plurality of color components in the color space in the form of a table; and a unit that refers to the table, which is stored in the expected values storage unit, and reads an expected quantity of ink in each pixel corresponding to the input image data.

The expected quantities of inks to be spouted in the respective pixels are determined according to the combinations of the tone values regarding the plurality of color components in the color space and stored in the form of a table. The arrangement discussed above enables the expected quantity of ink to be set in each pixel, based on this table.

In the printer of the above configuration, it is preferable that the table stored in the expected values storage unit specifies expected quantities of each color ink, which are determined by taking into account expected quantities of the other color inks irrespective of the hue, corresponding to the combinations of the tone values regarding the plurality of color components in the color space.

In the table stored in the expected values storage unit, the expected quantities of each color ink are determined by taking into account the expected quantities of the other color inks. This arrangement ensures regulation of the total quantity of ink and improves the picture quality of a resulting image. There is typically an upper limit in quantity of ink to be spouted per unit area. For example, it is assumed that the printer records an area of a specific density with two inks of different densities, that is, the light ink and the deep ink, for cyan. When the expected quantities of inks are small for the other hues, there is a sufficient margin to the upper limit. In this case, the expected values are set to use a large quantity of the light ink, which makes cyan dots relatively inconspicuous. When the expected quantities of inks are large for the other hues, on the other hand, there is an insufficient margin to the upper limit. In this case, the expected values are set to decrease the quantity of the light cyan ink and increase the quantity of the deep cyan ink.

A variety of methods may be applied to the multi-valuing unit in the printer of the present invention. Some examples of the available method include a dither method and an error diffusion method.

A single multi-valuing unit may be used for all the inks or alternatively separate multi-valuing units may be provided for the respective inks.

When the number of the different types of dots created by the printer is limited, the expected quantity of ink may not coincide with the quantity of ink actually used for creation of a dot. There is accordingly an error in ink quantity in each pixel. The printer of the above arrangement carries out the multi-valuing process to reduce such errors in the image as a whole, although there are errors occurring in the respective pixels. The dither method enables the high-speed multi-valuing process, whereas the error diffusion method appropriately reduces the errors to attain the favorable picture quality of resulting images.

In accordance with another preferable application of the printer, the multi-valuing unit includes: an expected value-by type setting unit that sets an expected value by type, that is, an expected value of ink quantity by each of the at least two different types of dots, which may be created by the head, based on the expected quantity of ink set by the expected ink quantity setting unit; and a unit that determines creation or non-creation of a dot in each pixel with respect to each of the at least two different types of dots, based on the expected value by type.

The printer of this arrangement sets the expected value of ink quantity by each type of the dot and regulates the occurrence of each type of the dot, in order to eliminate the errors in the image as a whole. This arrangement causes the dots of each type to be dispersed in a resulting image in a substantially homogeneous manner. The dots having the greater ink quantity are generally more conspicuous. A local polarization of such dots significantly deteriorates the picture quality of the resulting image. The arrangement causes even the dots having the greater ink quantity to be dispersed in a substantially homogeneous manner, thereby attaining the good picture quality of the resulting image where the dots are not inconspicuous.

In the printer of the present invention, it is preferable that dots created for an identical hue by the head include at least two different types of dots having a substantially identical mean density per unit area at one recording density.

When there are at least two different types of dots having a substantially identical mean density per unit area, there is a freedom in selection between these dots at a specific recording density that can record an image with these dots. This arrangement accordingly enables these dots to be created at an appropriate rate, in order to improve the picture quality and satisfy a variety of other requirements, while regulating the quantities of inks. The relationship between the mean density per unit area and the recording density of dots generally depends upon the type of the dot. In order to attain the effects discussed above, there should be at least one recording density, at which the at least two different types of dots have a substantially identical mean density.

In the printer of the present invention, it is also preferable that the expected ink quantity setting unit sets the expected quantity of ink in a specific range that does not cause a sum of ink quantities spouted for creation of dots per unit area irrespective of the hue to exceed a preset level, which depends upon the printing medium.

The printer of this arrangement regulates the sum of the ink quantities per unit area not to exceed a preset level, which is determined according to the type of the printing medium. The printing medium generally has an upper limit in absorbable quantity of ink. The spout of ink exceeding this upper limit causes the printing medium to be readily broken and makes ink stains on the printing medium, thereby significantly deteriorating the picture quality. The printer of the above arrangement regulates the sum of the ink quantities not to exceed the upper limit and thereby avoids such problems that lead to the deteriorating picture quality.

The preset level, which depends upon the type of the printing medium, is a quantity of ink set by taking into account a variety of factors of the printing medium, for example, the stain characteristics of the printing medium, the time required for drying the ink, the picture quality of the printed image, and the deformation of the printing medium due to absorption of ink. The preset level is not unequivocally determined by the printing medium, but also depends upon the printing speed and the color of the ink used for printing. The expected quantity of ink determined by considering such an upper limit should be different from an ideal quantity of ink set to attain the favorable picture quality when there is no restriction in ink quantity. One possible application of setting the expected quantity of ink by considering the upper limit changes the expected quantity of ink corresponding to an identical tone value between the normal printing paper and the special printing paper, which is manufactured for the purpose of the high-quality printing and absorbs a less amount of ink.

The preset level is the sum of ink quantities per unit area and does not prohibit the ink quantity from locally exceeding the preset level. For example, when the ink quantity exceeds the preset level with respect to a specific pixel, the requirement is to decrease the quantity of ink spouted in the vicinity of the specific pixel and cause the sum of the ink quantity not to exceed the preset level in the unit area as a whole.

In the printer of the present invention, the head used to create dots with inks of different densities or create dots having different ink quantities may have a mechanism for spouting an ink particle with a pressure applied to ink in an ink conduit by application of a voltage to a piezoelectric element disposed in the ink conduit. The head may alternatively have a mechanism for spouting an ink particle with a pressure applied to ink in an ink conduit by bubbles produced by supply of electricity to a heating element disposed in the ink conduit. These mechanisms facilitate the formation of finer ink particles and the appropriate regulation of the ink quantities. These mechanisms also allow a large number of nozzles to be formed on the head. In the latter case, the large number of nozzles for spouting ink particles are arranged in the feeding direction of the printing paper for the respective inks of different colors and different densities. The use of the large number of nozzles improves the printing speed.

A possible application of the present invention other than the printer is a method of printing. Another possible application of the present invention is a recording medium, in which a program used for driving the printer having any one of the arrangements discussed above or data used in the program are recorded.

Typical examples of the recording media include flexible disks, CD-ROMs, magneto-optic discs, IC cards, ROM cartridges, punched cards, prints with bar codes or other codes printed thereon, internal storage devices (memories like a RAM and a ROM) and external storage devices of the computer, and a variety of other computer readable media. Still another application of the invention is a program supply apparatus that supplies the program to the computer via a communications path. In this case, the program for driving the printer may be supplied collectively as a whole or in the unit of each module.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
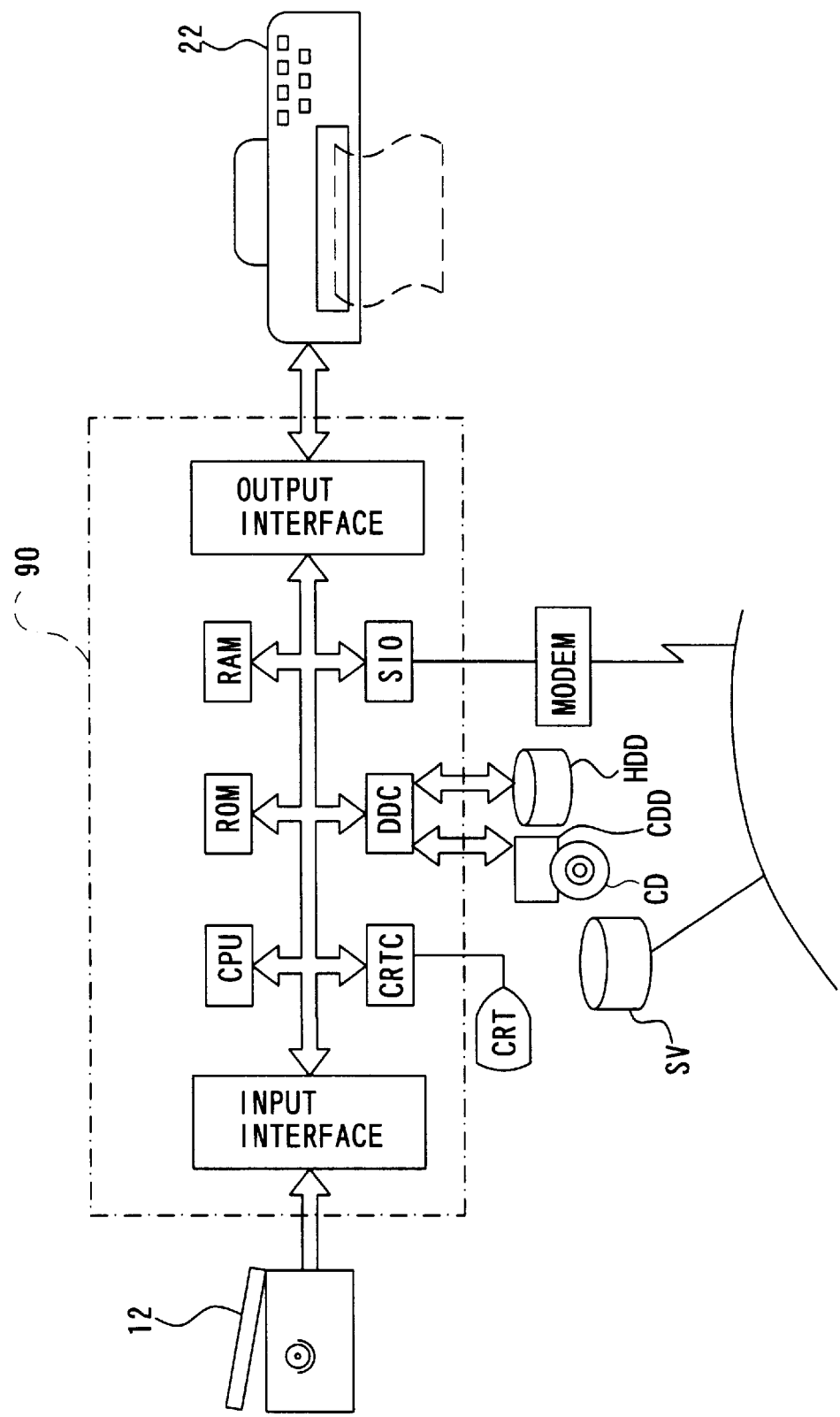
FIG. 1 is a block diagram illustrating the structure of a printing system including a printer 22 embodying the present invention.

The printing system includes a computer 90 connected to a scanner 12 and a color printer 22 as illustrated in FIG. 1. The computer 90 reads a program required for driving the printer 22 from a CD-ROM drive CDD or a flexible disk drive (not shown). The computer 90 is connected to an external network via a modem and can download a program required for driving the printer 22 from a specific server SV into a hard disk HDD.

Figure 2:
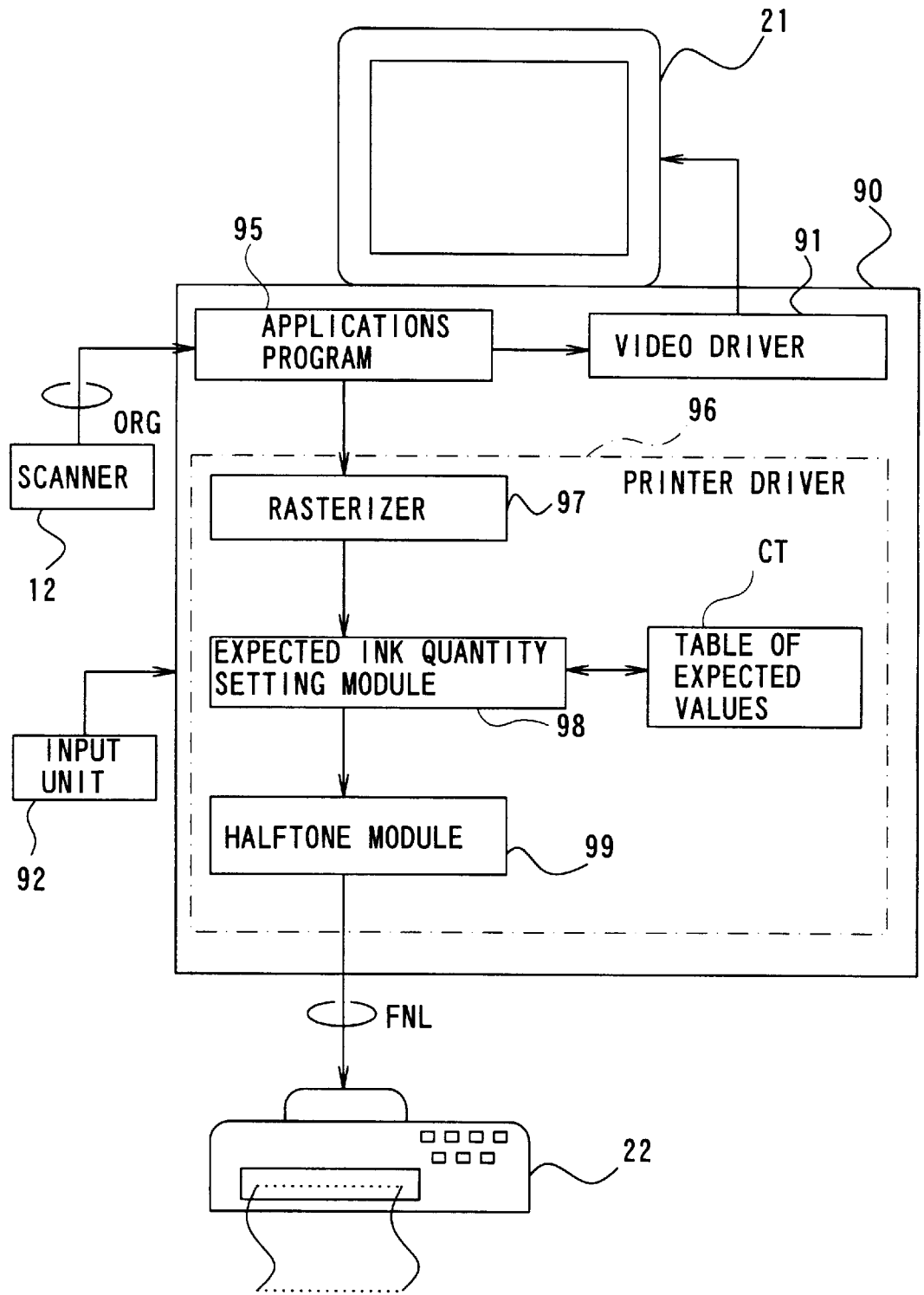
FIG. 2 is a functional block diagram illustrating the respective functions of image processing.

The computer includes a CPU, a RAM, and a ROM and executes an applications program 95 shown in FIG. 2 under a specific operating system. FIG. 2 is a functional block diagram illustrating the respective functions of image processing. The computer 90 has a color display 21 and an input device 92 including a keyboard and a mouse. The scanner 12 reads color image data from a color original and outputs the color image data as original color image data ORG, which consists of three color components, red (R), green (G), and blue (B), to the computer 90. The applications program 95, which implements required image processing, such as retouching of images, reads an image from the scanner 12, causes the input image to be subjected to the required image processing, and displays the processed image on a CRT display 21 via a video driver 91.

A printer driver 96 other than the video driver 91 discussed above is incorporated into the operating system. When the applications program 95 issues an instruction of printing, the printer driver 96 receives image information from the applications program 95 and converts the input image information into signals FNL printable by the printer 22 (in this embodiment, binarized signals with respect to six colors, cyan, light cyan, magenta, light magenta, yellow, and black). In the example of FIG. 2, the printer driver 96 includes a rasterizer 97, which converts the color image data processed by the applications program 95 into dot-unit image data, that is, image data in the unit of each dot (hereinafter may be referred to as a pixel), an expected ink quantity setting module 98, which sets an expected quantity of ink spout for each color based on the dot-unit image data by taking into account the ink colors used by and the characteristics of the color development of the printer 22, a table of expected values IT referred to by the expected ink quantity setteing module 98, and a halftone module 99, which generates halftone image information that expresses the density of a certain area as creation or non-creation of dots in the respective pixels based on the expected quantity of ink spout set by the expected ink quantity setting module 98. The printer 22 receives the printable signals FNL and records an image corresponding to the image information given in the form of the printable signals FNL on a printing medium.

Figure 3:
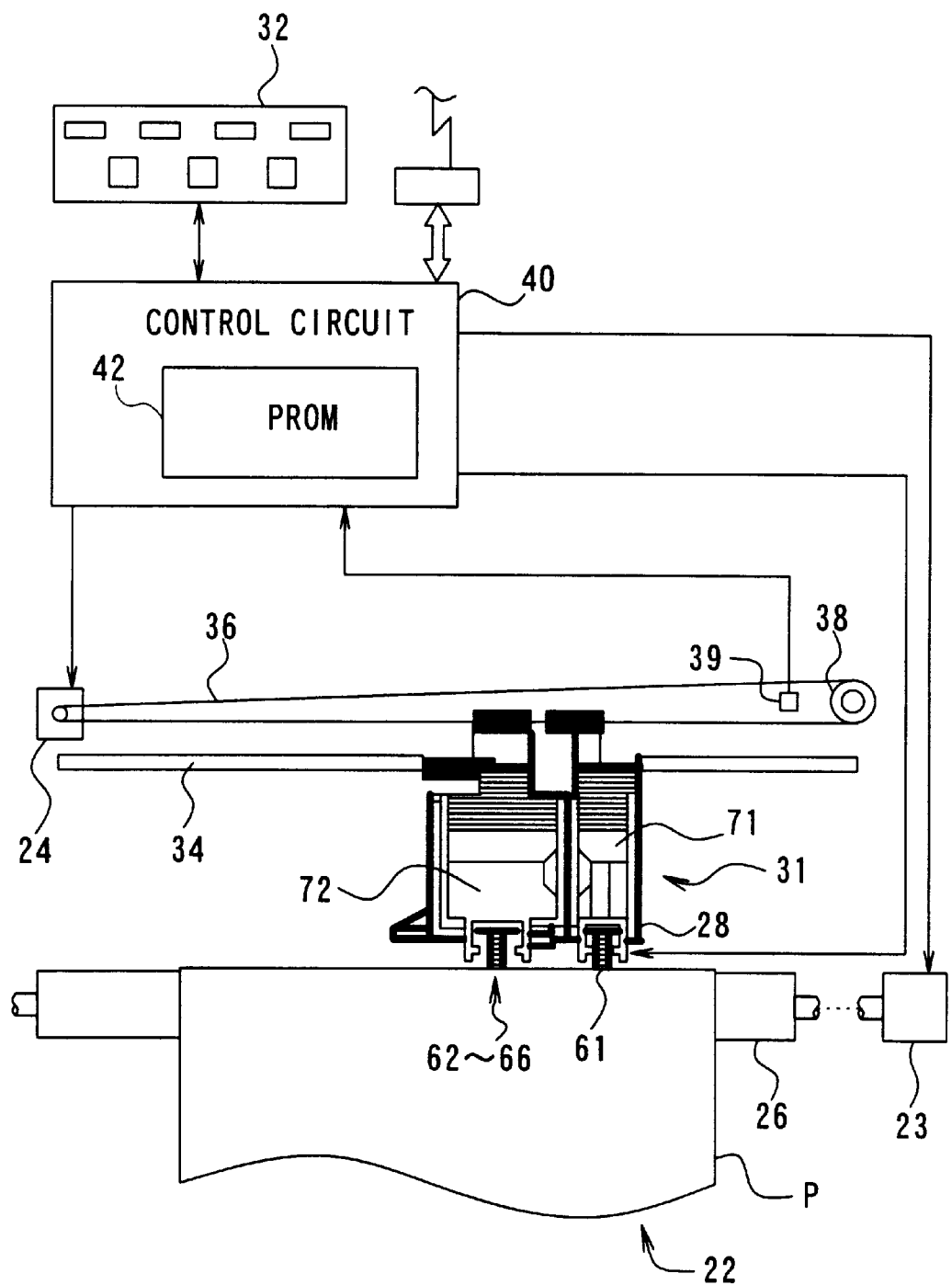
FIG. 3 schematically illustrates the structure of the printer 22.

The schematic structure of the printer 22 used in this embodiment is described with the drawing of FIG. 3. As illustrated in FIG. 3, the printer 22 has a mechanism for causing a sheet feed motor 23 to feed a sheet of printing paper P, a mechanism for causing a carriage motor 24 to move a carriage 31 forward and backward along an axis of a platen 26, a mechanism for driving a print head 28 mounted on the carriage 31 to control spout of ink and creation of dots, and a control circuit 40 that controls transmission of signals to and from the sheet feed motor 23, the carriage motor 24, the print head 28, and a control panel 32.

A black ink cartridge 71 for black ink (Bk) and a color ink cartridge 72 in which five color inks, that is, cyan (C1), light cyan (C2), magenta (M1), light magenta (M2), and yellow (Y), are accommodated may be mounted on the carriage 31 of the printer 22. Both the higher-density ink (deep ink) and the lower-density ink (light ink) are provided for the two colors, cyan and magenta. The densities of these inks will be discussed later. A total of six ink spout heads 61 through 66 are formed on the print head 28 that is disposed in the lower portion of the carriage 31, and ink supply conduits 67 (see FIG. 4) are arranged upright in the bottom portion of the carriage 31 for leading supplies of inks from ink tanks to the respective ink spout heads 61 through 66. When the black ink cartridge 71 and the color ink cartridge 72 are attached downward to the carriage 31, the ink supply conduits 67 are inserted into connection apertures (not shown) formed in the respective ink cartridges 71 and 72. This enables supplies of inks to be fed from the respective ink cartridges 71 and 72 to the ink spout heads 61 through 66.

The following briefly describes the mechanism of spouting ink.

Figure 4:
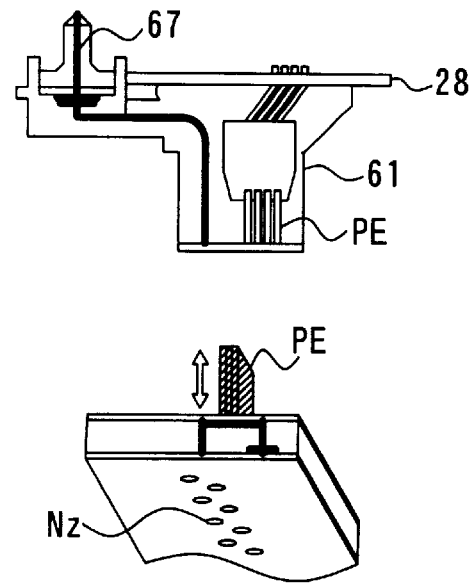
FIG. 4 schematically illustrates the internal structure of a print head in the printer 22.

FIG. 4 schematically illustrates the internal structure of the print head 28. When the ink cartridges 71 and 72 are attached to the carriage 31, supplies of inks in the ink cartridges 71 and 72 are sucked out by capillarity through the ink supply conduits 67 and are led to the ink spout heads 61 through 66 formed in the print head 28 arranged in the lower portion of the carriage 31 as shown in FIG. 4. In the case where the ink cartridges 71 and 72 are attached to the carriage 31 for the first time, a pump works to suck first supplies of inks into the respective ink spout heads 61 through 66. In this embodiment, structures of the pump for suction and a cap for covering the print head 28 during the suction are not illustrated nor described specifically.

Figure 5:
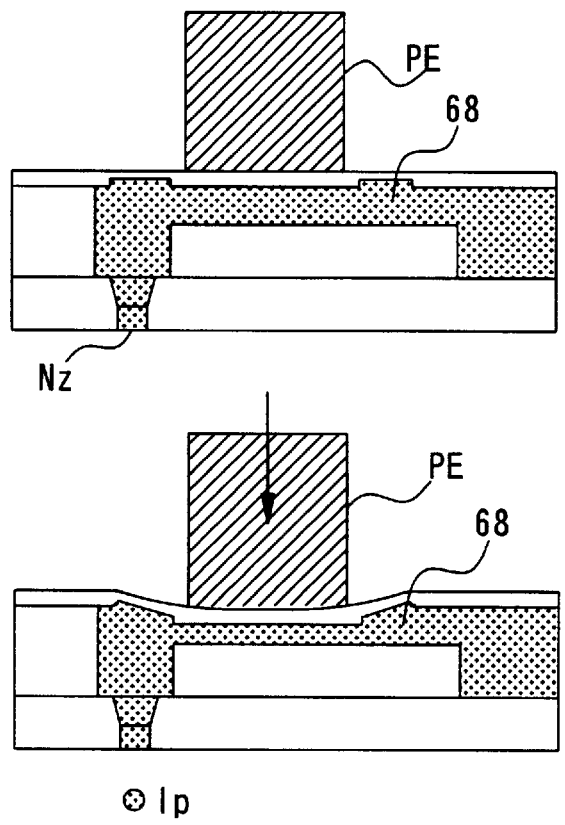
FIG. 5 shows the principle of dot creation in the printer 22.

An array of thirty-two nozzles Nz (see FIG. 7) is formed in each of the ink spout heads 61 through 66 as discussed later. A piezoelectric element PE, which is one of electrically distorting elements and has an excellent response, is arranged for each nozzle Nz. FIG. 5 illustrates a configuration of the piezoelectric element PE and the nozzle Nz. As shown in the upper drawing of FIG. 5, the piezoelectric element PE is disposed at a position that comes into contact with an ink conduit 68 for leading ink to the nozzle Nz. As is known by those skilled in the art, the piezoelectric element PE has a crystal structure that is subjected to mechanical stress due to application of a voltage and thereby carries out extremely high-speed conversion of electrical energy into mechanical energy. In this embodiment, application of a voltage between electrodes on both ends of the piezoelectric element PE for a predetermined time period causes the piezoelectric element PE to extend for the predetermined time period and deform one side wall of the ink conduit 68 as shown in the lower drawing of FIG. 5. The volume of the ink conduit 68 is reduced with an extension of the piezoelectric element PE, and a certain amount of ink corresponding to the reduced volume is sprayed as an ink particle Ip from the end of the nozzle Nz at a high speed. The ink particles Ip soak into the sheet of paper P set on the platen 26, so as to implement printing.

In the printer 22 of the embodiment having the hardware structure discussed above, while the sheet feed motor 23 rotates the platen 26 and the other related rollers to feed the sheet of paper P (hereinafter referred to as the sub-scan), the carriage motor 24 drives and reciprocates the carriage 31 (hereinafter referred to as the main scan), simultaneously with actuation of the piezoelectric elements PE on the respective ink spout heads 61 through 66 of the print head 28. The printer 22 accordingly sprays the respective color inks to create dots and thereby forms a multi-color image on the sheet of paper P.

The mechanism for feeding the sheet of paper P has a gear train (not shown) that transmits rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 that detects the position of the origin of the carriage 31.

Figure 6:
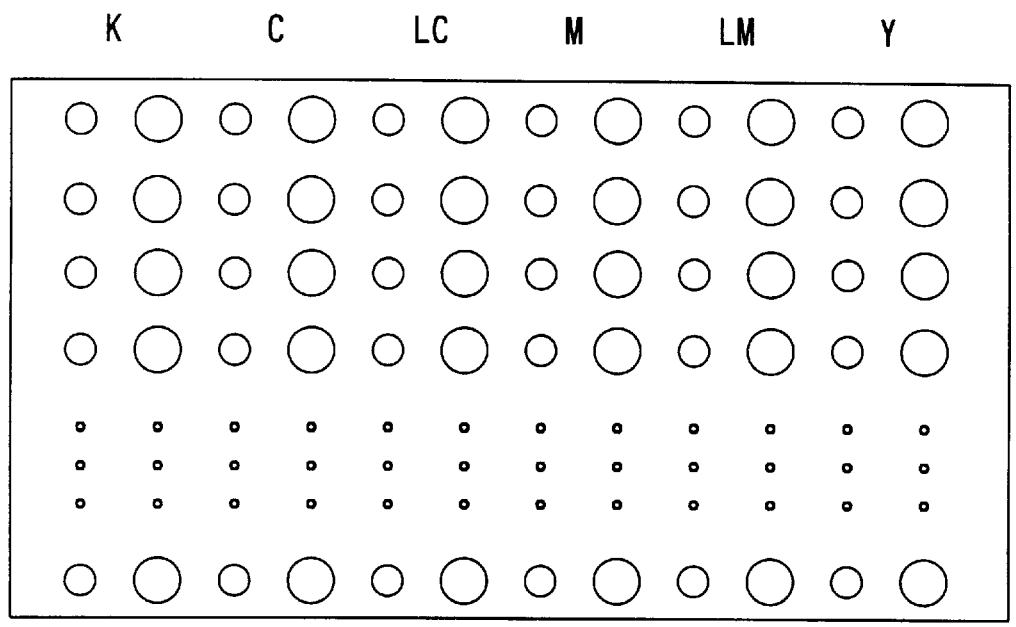
FIG. 6 shows a possible arrangement of nozzles in the printer 22.
Figure 7:
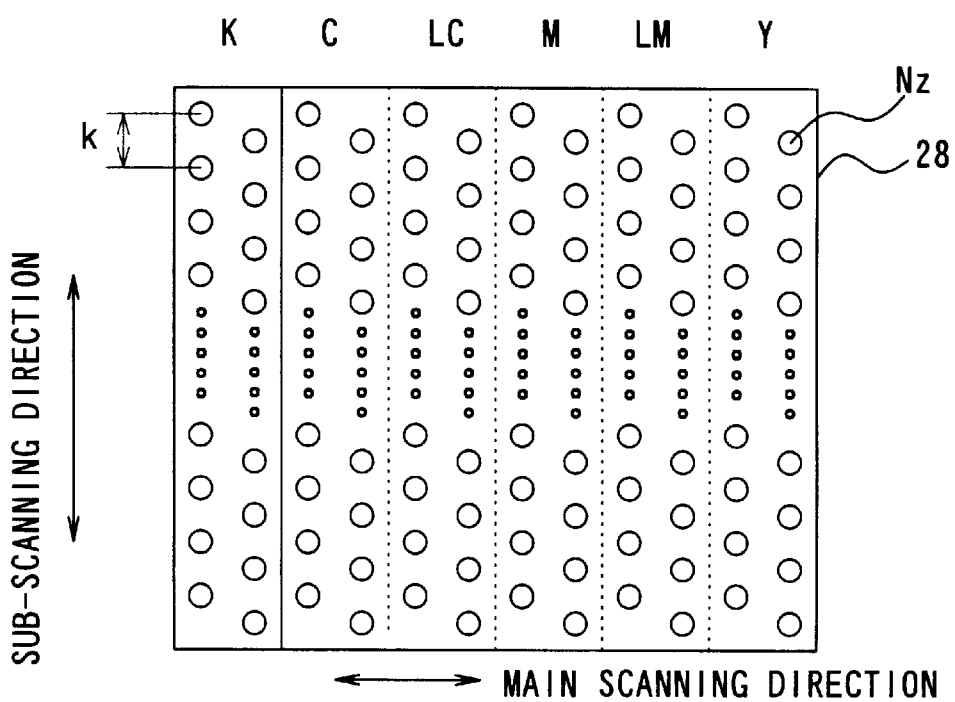
FIG. 7 shows another possible arrangement of nozzles in the printer 22.

FIGS. 6 and 7 show possible arrangements of the ink jet nozzles Nz in the ink spout heads 61 through 66. The printer 22 of this embodiment may create three different types of dots having different amounts of ink with respect to each color. In the even that dots formed have a circular shape, the three different types of dots imply dots having three different dot diameters, that is, large, medium, and small. In the description below, 'the dots having different amounts of ink' are synonymous with the 'dots having different dot diameters' in this sense.

A structure that provides nozzles of different diameters for each color as shown in FIG. 6 may be applied to create the dots having different dot diameters. This embodiment, however, adopts the structure of FIG. 7 that provides nozzles of a fixed diameter and creates the dots having different dot diameters according to a control procedure discussed below. The arrangement of nozzles shown in FIG. 7 includes six nozzle arrays, wherein each nozzle array spouts ink of each color and includes thirty-two nozzles Nz arranged in zigzag at a fixed nozzle pitch k. The positions of the nozzles in the sub-scanning direction are identical in the respective nozzle arrays. The thirty-two nozzles Nz included in each nozzle array may be arranged in alignment, instead of in zigzag. The zigzag arrangement shown in FIG. 7, however, allows a small value to be set to the nozzle pitch k in the manufacturing process.

Figure 8:
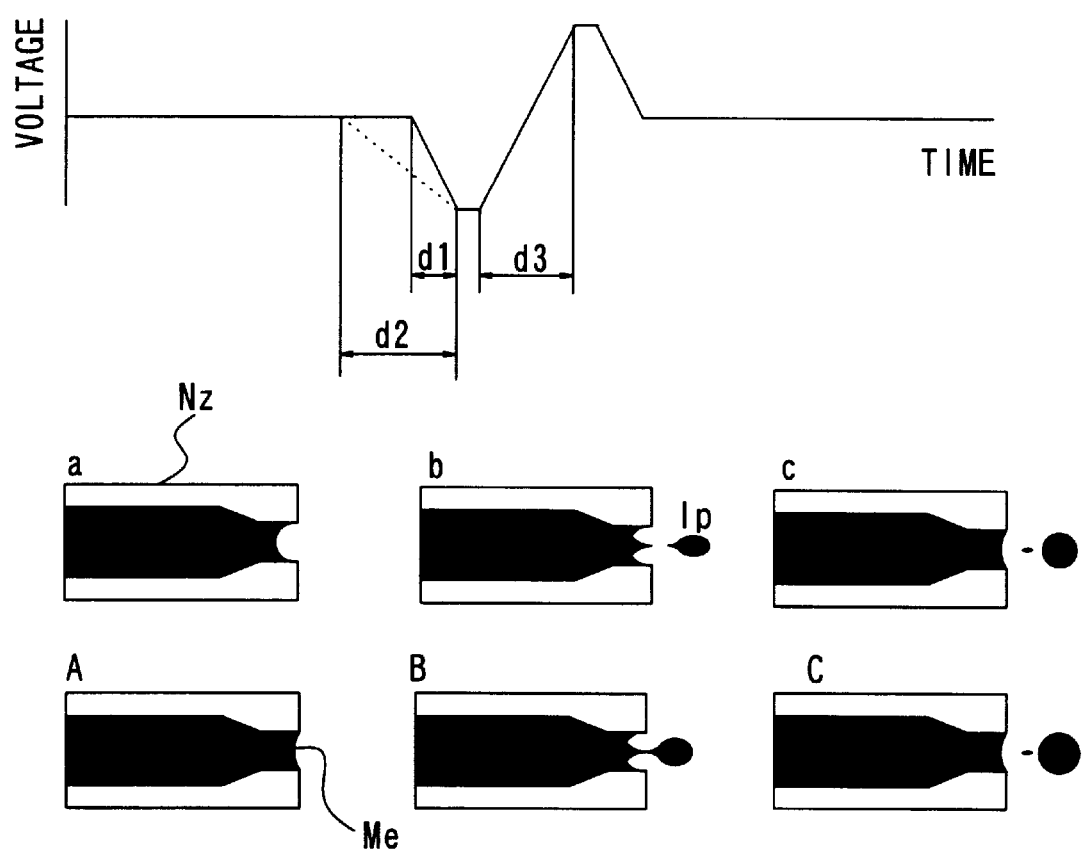
FIG. 8 shows the principle of creating dots having different dot diameters in the printer 22.

The printer 22 can create the three different types of dots having different dot diameters with the head including the nozzles of a fixed diameter. The following describes the principle of such dot creation technique. FIG. 8 shows the relationship between the driving waveform of the nozzle Nz and the size of the ink particle Ip spouted from the nozzle Nz. The driving waveform shown by the broken line in FIG. 8 is used to create standard-sized dots. A decrease in voltage applied to the piezoelectric element PE in a division d2 deforms the piezoelectric element PE in the direction of increasing the cross section of the ink conduit 68, contrary to the case discussed previously with the drawing of FIG. 5. As shown in a state A of FIG. 8, an ink interface Me, which is generally referred to as meniscus, is thus slightly concaved inward the nozzle Nz. When the driving waveform shown by the solid line in FIG. 8 is used to abruptly lower the voltage in a division d1, on the other hand, the meniscus is more significantly concaved inward the nozzle Nz as shown in a state 'a', compared with the state A. A subsequent increase in voltage applied to the piezoelectric element PE in a division d3 causes the ink to be spouted, based on the principle described previously with the drawing of FIG. 5. As shown in states B and C, a large ink droplet is spouted when the meniscus is only slightly concaved inward (state A). As shown in states 'b' and 'c', on the other hand, a small ink droplet is spouted when the meniscus is significantly concaved inward (state 'a').

Figure 9:
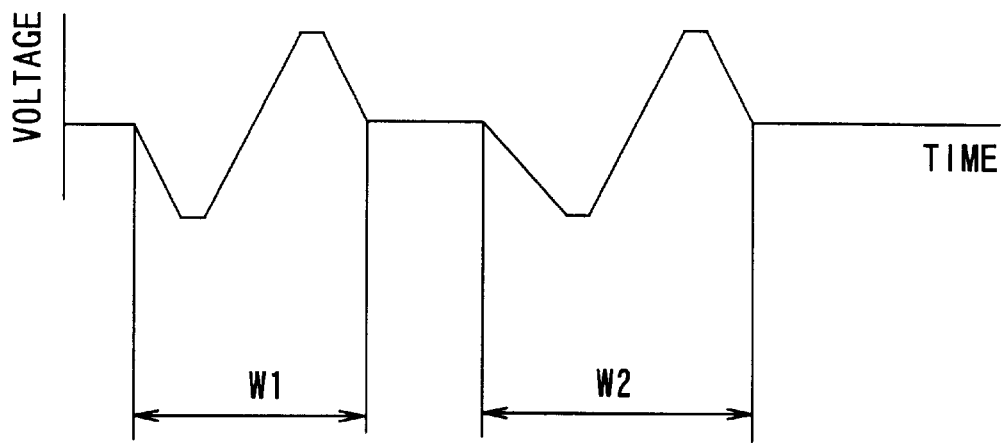
FIG. 9 shows driving waveforms of nozzles in the printer 22 and dots created in response to the driving waveforms.
Figure 9:
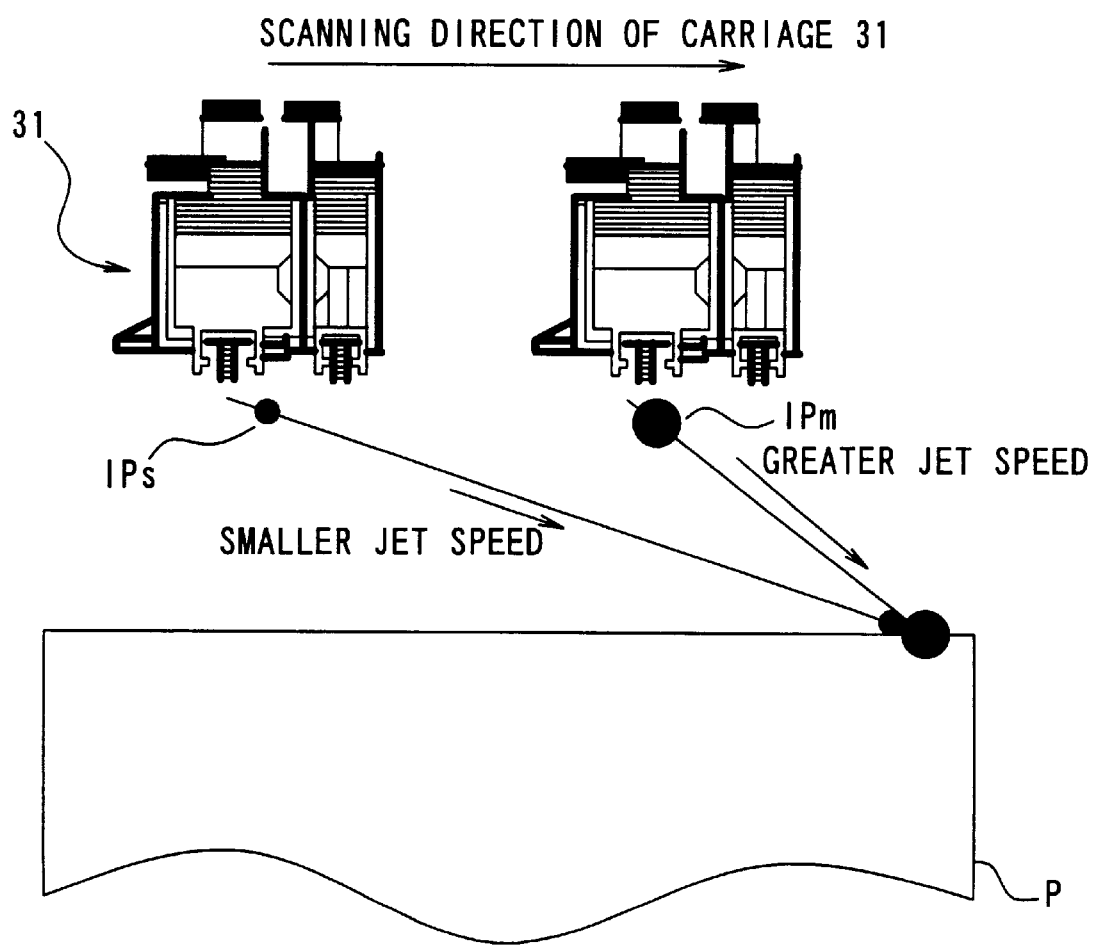

Based on the above principle, the dot diameter may be varied according to the driving waveform for driving the nozzle, that is, according to the rate of change in the divisions d1 and d2 where the driving voltage applied to the piezoelectric element PE is lowered. This embodiment provides two different driving waveforms, that is, one for creating small dots having the smallest diameter and the other for creating medium dots having the intermediate diameter, based on the relationship between the driving waveform and the dot diameter. FIG. 9 shows driving waveforms used in this embodiment. A driving waveform W1 is used to create the small dots, whereas a driving waveform W2 is used to create the medium dots. These two driving waveforms enable two different types of dots having different dot diameters, that is, the small dot and the medium dot, to be created with the nozzles Nz of an identical diameter.

Large dots are created by using both the driving waveforms W1 and W2 shown in FIG. 9. The lower part of FIG. 9 shows the process of hitting an ink droplet IPs for the small dot and an ink droplet IPm for the medium dot spouted from the nozzle against the printing paper P. When both the small dot and the medium dot are created in response to the driving waveforms of FIG. 9, the ink droplet IPm for the medium dot has a higher jet speed due to a greater amount of change of the piezoelectric element PE. Namely there is a difference in jet speed between these two types of ink droplets. Regulation of the scanning speed of the carriage 31 in the main scanning direction and the timings for successively spouting the ink droplet IPs for the small dot and the ink droplet IPm for the medium dot according to the distance between the carriage 31 and the printing paper P enables both the ink droplets to reach the printing paper P at a substantially identical timing. In this manner, the embodiment creates a large dot having the greatest dot diameter with the two driving waveforms shown in the upper part of FIG. 9.

Figure 10:
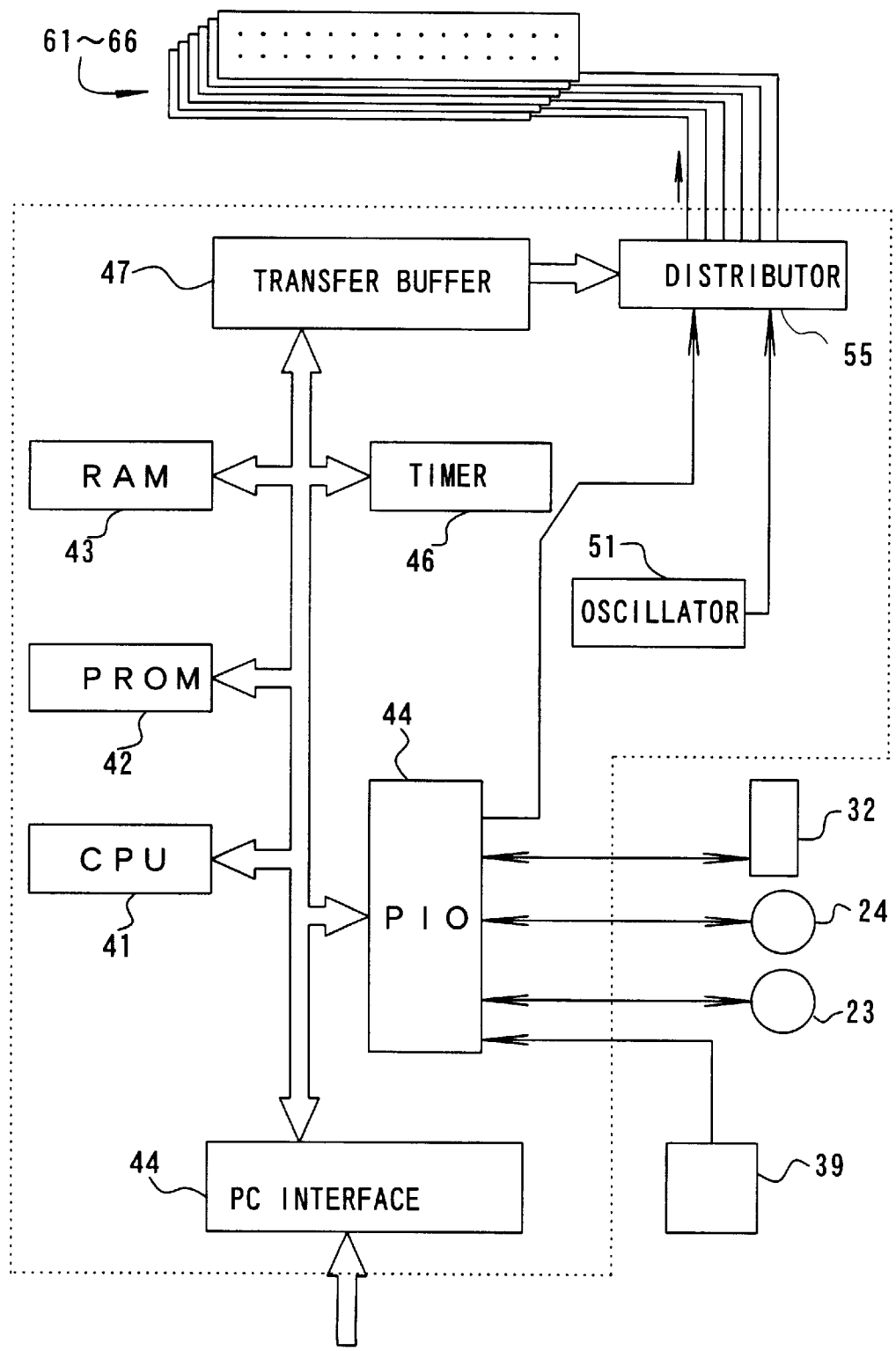
FIG. 10 is a block diagram schematically illustrating the internal structure of the printer 22.

The following describes the internal structure of the control circuit 40 in the printer 22 and the method of driving the print head 28 with the plurality of nozzles Nz arranged as shown in FIG. 7 in response to the driving waveforms discussed above. FIG. 10 illustrates the internal structure of the control circuit 40. The control circuit 40 includes a CPU 41, a PROM 42, a RAM 43, a PC interface 44 that transmits data to and from the computer 90, a peripheral equipment input-output unit (PIO) 45 that transmits signals to and from the peripheral equipment, such as the sheet feed motor 23, the carriage motor 24, and the control panel 32, a timer 46 that counts the time, and a transfer buffer 47 that outputs dot on-off signals to the ink spout heads 61 through 66. These elements and circuits are mutually connected via a bus 48.

The control circuit 40 further includes an oscillator 51 that outputs driving waveforms at selected frequencies (see FIG. 9) and a distributor 55 that distributes the outputs from the oscillator 51 to the ink spout heads 61 through 66 at selected timings. The control circuit 40 receives dot data processed by the computer 90, temporarily stores the processed dot data in the RAM 43, and outputs the dot data to the transfer buffer 47 at a preset timing. In this embodiment, the printer 22 does not execute the image processing required for generating a multi-tone image. The control circuit 40 in the printer 22 accordingly carries out only the control operation to determine the on-off state of each dot, that is, to determine whether or not a dot is to be created in each pixel.

Figure 11:
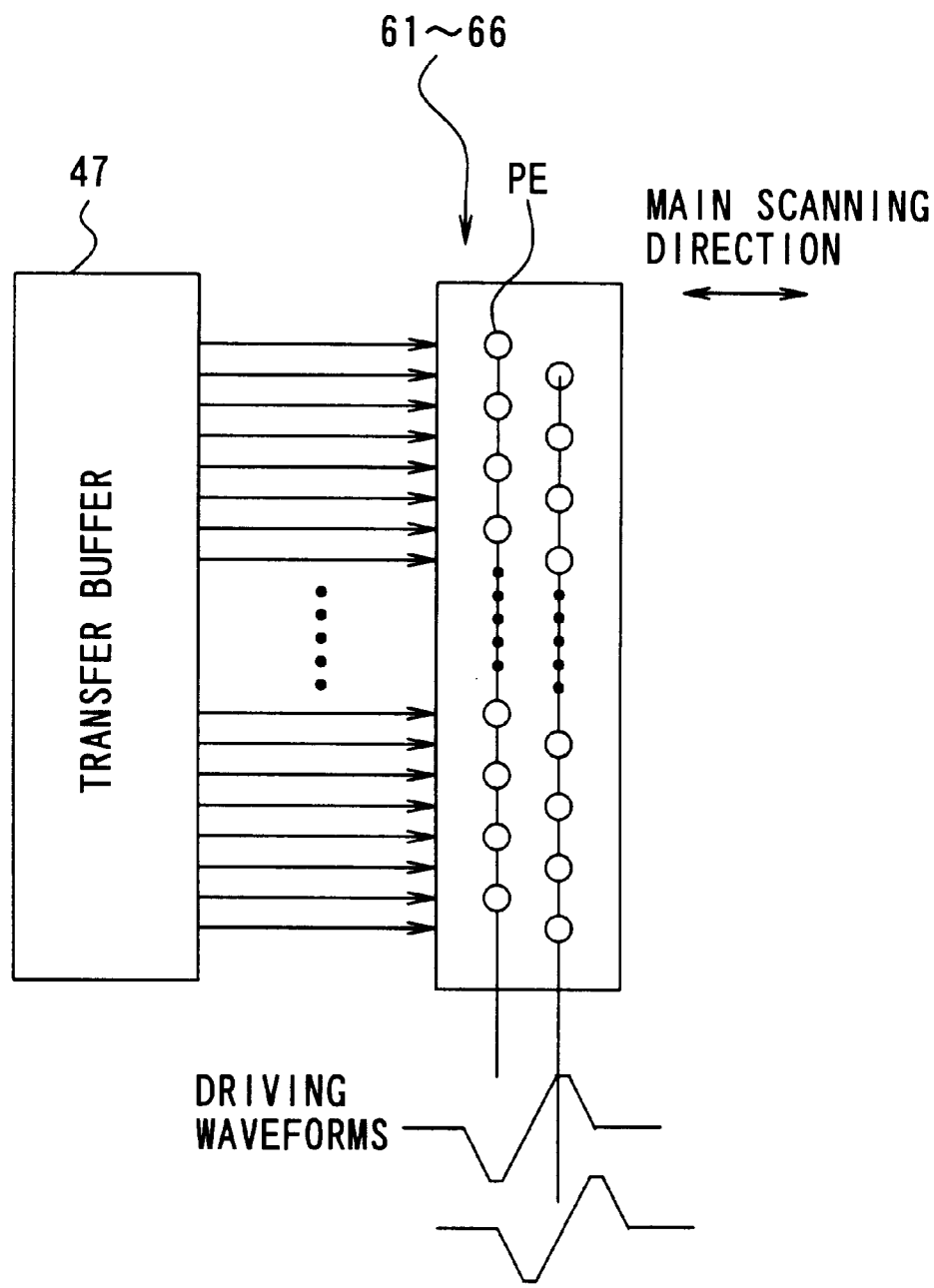
FIG. 11 shows a driving circuit structure of the print head.

The control circuit 40 outputs signals to the ink spout heads 61 through 66 in the form discussed below. FIG. 11 shows a connection in one nozzle array on one of the ink spout heads 61 through 66. One nozzle array on one of the ink spout heads 61 through 66 is arranged in a circuit that includes the transfer buffer 47 as the source and the distributor 55 as the sink. The piezoelectric elements PE corresponding to the nozzles included in the nozzle array have one electrodes respectively connected to the output terminals of the transfer buffer 47 and the other electrodes collectively connected to the output terminal of the distributor 55. The driving waveforms of the oscillator 51 are output from the distributor 55 as shown in FIG. 11. When the CPU 41 outputs the dot on/off signals of the respective nozzles to the terminals of the transfer buffer 47, only the piezoelectric elements PE receiving the ON signal from the transfer buffer 47 are driven in response to the output driving waveforms. The ink particles Ip are thus spouted from the nozzles corresponding to the piezoelectric elements PE that have received the ON signal from the transfer buffer 47.

As illustrated in FIG. 9, the driving waveform W1 for the small dot and the driving waveform W2 for the medium dot are alternately output. When a small dot is to be created in a certain pixel, the ON signal is transferred to the nozzle array synchronously with the driving waveform W1 for the small dot while the OFF signal is transferred to the nozzle array synchronously with the driving waveform W2 for the medium dot. In order to create a medium dot in a certain pixel, on the other hand, the OFF signal is transferred to the nozzle array synchronously with the driving waveform W1 for the small dot while the ON signal is transferred to the nozzle array synchronously with the driving waveform W2 for the medium dot. In order to create a large dot in a certain pixel, the ON signal is transferred to the nozzle array synchronously with both the driving wave form W1 for the small dot and the driving waveform W2 for the medium dot. The printer 22 of this embodiment thus enables the dots having the greatest, the intermediate, and the smallest diameters to be created by each nozzle array in the course of one main scan.

One possible modification provides three driving waveforms for creating the three different types of dots having different diameters, that is, the large dot, the medium dot, and the small dot and three oscillators for outputting these three driving waveforms, and selectively uses one of the driving waveforms corresponding to the dot diameter of the dot to be created. The dot diameter is not restricted to the three values, the largest, the intermediate, and the smallest diameters. There may be a greater number of different driving waveforms used to output a greater number of different dots having different diameters. Alternatively there may be only two of the above three dot diameters.

The ink spout heads 61 through 66 are arranged in the moving direction of the carriage 31 as shown in FIG. 7, so that the respective nozzle arrays reach a specific position on the printing paper P at different timings. The CPU 41 outputs the dot on-off signals at required timings via the transfer buffer 47 to create the dots of the respective colors by taking into account the positional difference between the corresponding nozzles included in the ink spout heads 61 through 66. The CPU 41 also controls the output of the dot on-off signals by considering the two-line arrangement of each nozzle array on each of the ink spout heads 61 through 66.

This embodiment provides six different types of dots having different ink densities, that is, the large, the medium, and the small dots created with the lower-density ink or light ink (hereinafter respectively referred to as the light large dot, the light medium dot, and the light small dot) and the large, the medium, and the small dots created with the higher-density ink or deep ink (hereinafter respectively referred to as the deep large dot, the deep medium dot, and the deep small dot). One possible modification sets the density of the deep small dot to be substantially identical with the density of the light large dot. The substantially identical density here means that the two different types of dots respectively printed at a specific recording density have a substantially identical mean density per unit area. Such modification favorably enhances the degree of freedom in selection of the deep small dot and the light large dot, although reducing the number of expressible tones in each pixel.

(2) Dot Creation Process

Figure 12:
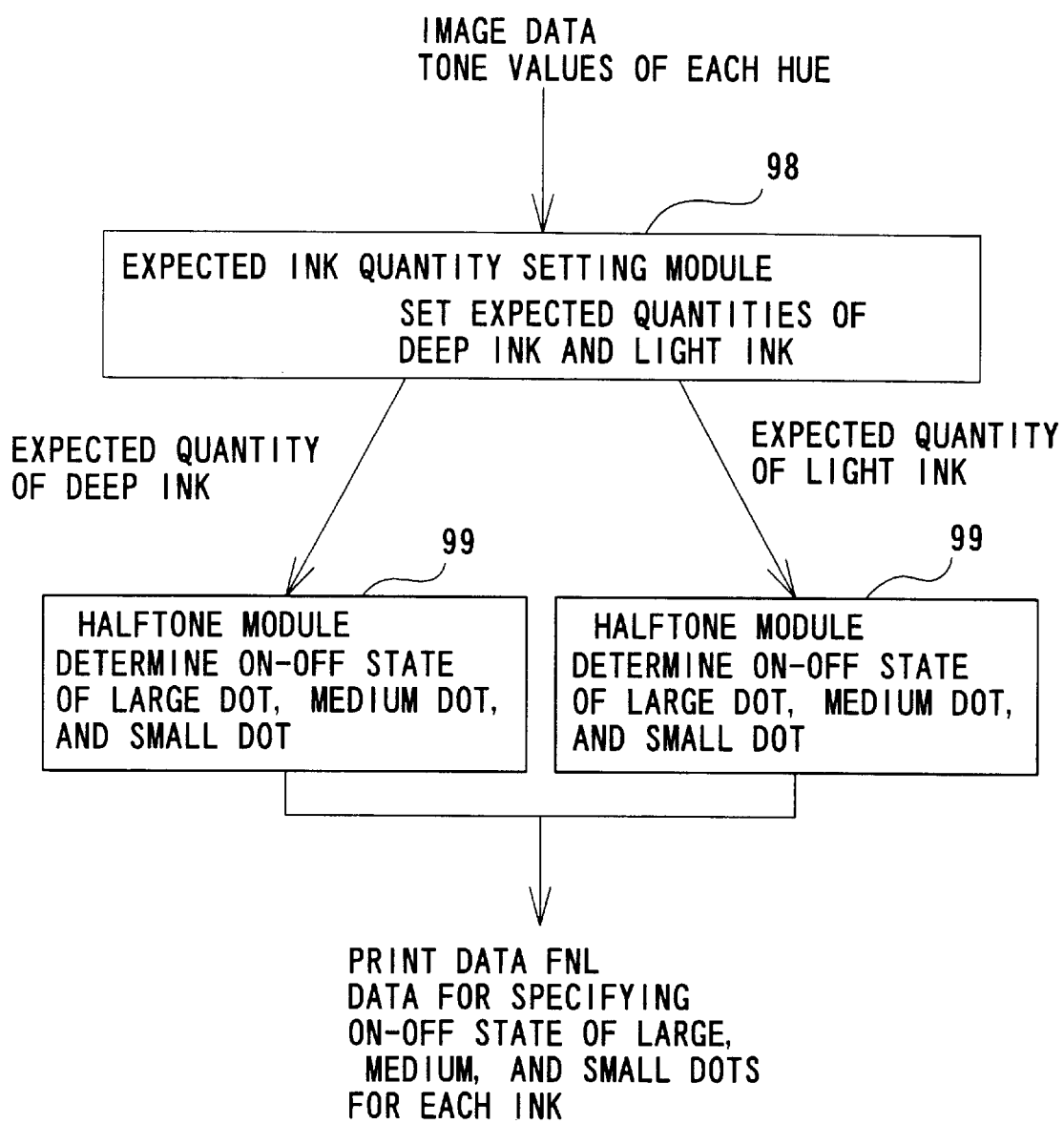
FIG. 12 shows the concept of a dot creation process in this embodiment.

The following describes a dot creation process carried out in this embodiment. FIG. 12 shows the concept of the dot creation process in this embodiment. The procedure of this embodiment converts image data into print data in two stages. The image data is given as data having tone values of the respective color components for each pixel. The first stage of processing sets expected quantities of inks to be spouted with respect to both the deep ink and the light ink, based on the tone values. This process corresponds to the processing executed by the expected ink quantity setting module 98 shown in FIG. 2. Since the color components given as the image data are different from the color components expressible by the printer 22, the first stage of processing sets the expected quantities of inks while implementing the conversion of the color components.

After the first stage of processing, which sets the expected quantities of inks to be spouted with respect to both the deep ink and the light ink, the second stage of processing individually determines the on-off state of the respective dots, that is, the large dot, the medium dot, and the small dot, for the deep ink and the light ink based on the expected quantities of inks. This process corresponds to the processing executed by the halftone module 99 shown in FIG. 2. The procedure of this embodiment sets the print data FNL through the two stages of processing, that is, the first stage of processing that divides the amount of ink to be spouted for each hue into the expected quantity of deep ink and the expected quantity of light ink and the second stage of processing that further divides each expected quantity of ink into quantities of ink to be spouted with respect to the large dot, the medium dot, and the small dot.

Figure 13:
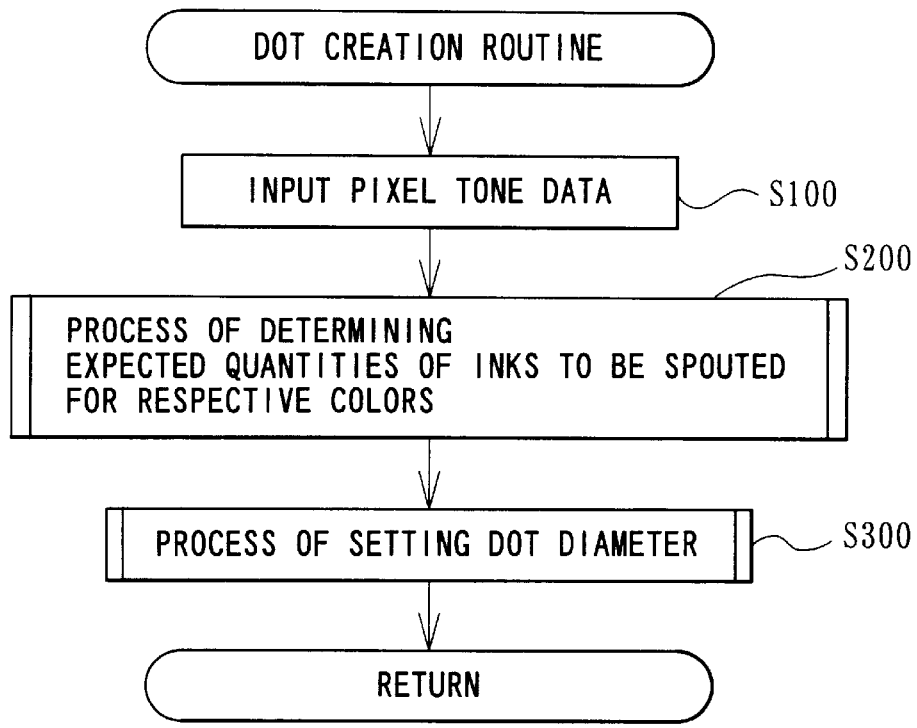
FIG. 13 is a flowchart showing a dot creation routine.

FIG. 13 is a flowchart showing a dot creation routine executed in the first embodiment of the present invention. This routine is part of the processing executed by the halftone module 99 included in the printer driver 96 and carried out by the CPU of the computer 90 in this embodiment.

When the program enters the dot creation routine, the CPU first inputs pixel tone data at step S100. The pixel tone data input here represents the image data of R, G, and B obtained by converting a color image into the dot-unit image data. The pixel tone data is 8-bit data having the tone values in the range of 0 to 255 in each hue.

The CPU subsequently determines expected quantities of inks to be spouted with respect to the six color inks used in the printer 22 at step S200. The expected quantities of inks are set to print the color corresponding to the input image data. The expected quantities of the respective color inks are determined in such a manner that prevents the total quantity of ink for the six colors from exceeding a spouting amount of ink per unit area of printing paper (hereinafter referred to as the ink duty). For cyan and magenta having the higher-density ink (deep ink) and the lower-density ink (light ink), the CPU determines the expected quantities of the light ink and deep ink to be spouted to express the density given as the image data. There may be a variety of operations applicable to this step, and the details of this step will be discussed later.

After determining the expected quantities of inks to be spouted for the respective colors at step S200, the CPU sets the diameter of the dot to be created in each pixel, based on the expected quantities of inks at step S300. There may also be a variety of applications applicable to this step, and the details of this step will be discussed later.

The above procedure determines the expected quantities of inks to be spouted for the respective colors according to the input image data by taking into account the restriction of the ink duty, and then determines the diameters of the dots to be created in the range that does not exceed each expected quantity of ink. This arrangement enables the resulting printed image to keep the restriction of the ink duty.

(3) Process of Determining Expected Quantities of Inks to be Spouted for Respective Colors As mentioned previously, there are a variety of operations applicable to set the expected quantities of inks to be spouted per unit area while keeping the restriction of the ink duty. Two possible applications are successively described below as examples of the process of determining the expected quantities of inks.

Figure 14:
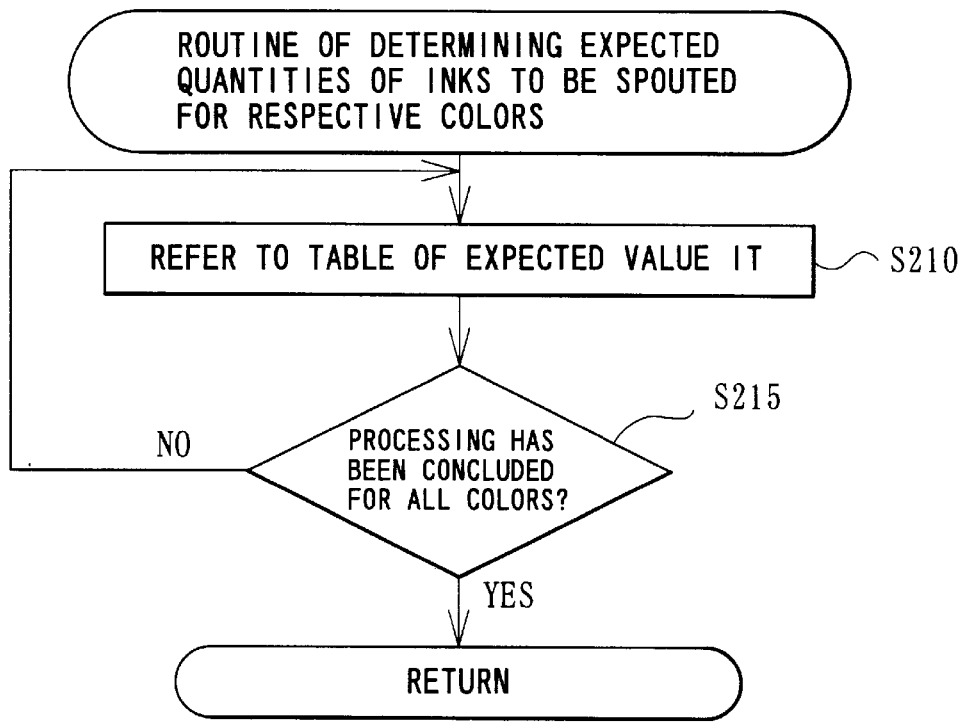
FIG. 14 is a flowchart showing a first routine of determining the expected quantities of inks to be spouted for the respective colors.

A first procedure of determining the expected quantities of inks to be spouted for the respective colors is discussed with the flowchart of FIG. 14. When the program enters the routine of FIG. 14, the CPU refers to the table of expected values IT for each color, so as to determine the expected quantity of ink to be spouted at step S210. The respective colors here represent the colors of the respective inks and do not mean the hues. In this routine, the processing is carried out separately for cyan ink and light cyan ink to set the expected quantities of these inks.

Figure 15:
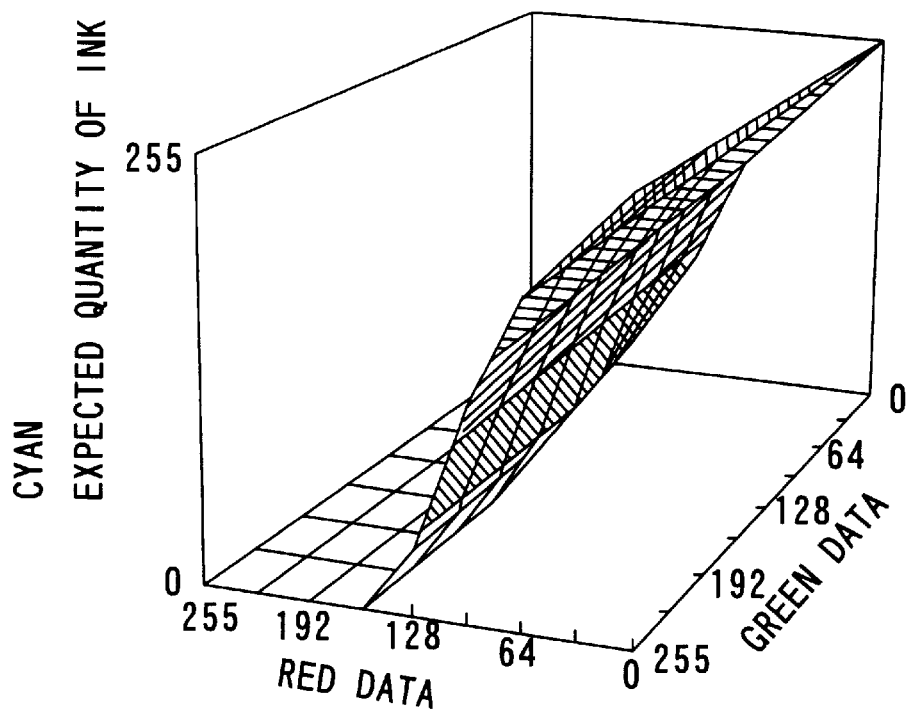
FIG. 15 is a table for specifying the expected quantities of cyan ink in the first routine of FIG. 14.
Figure 16:
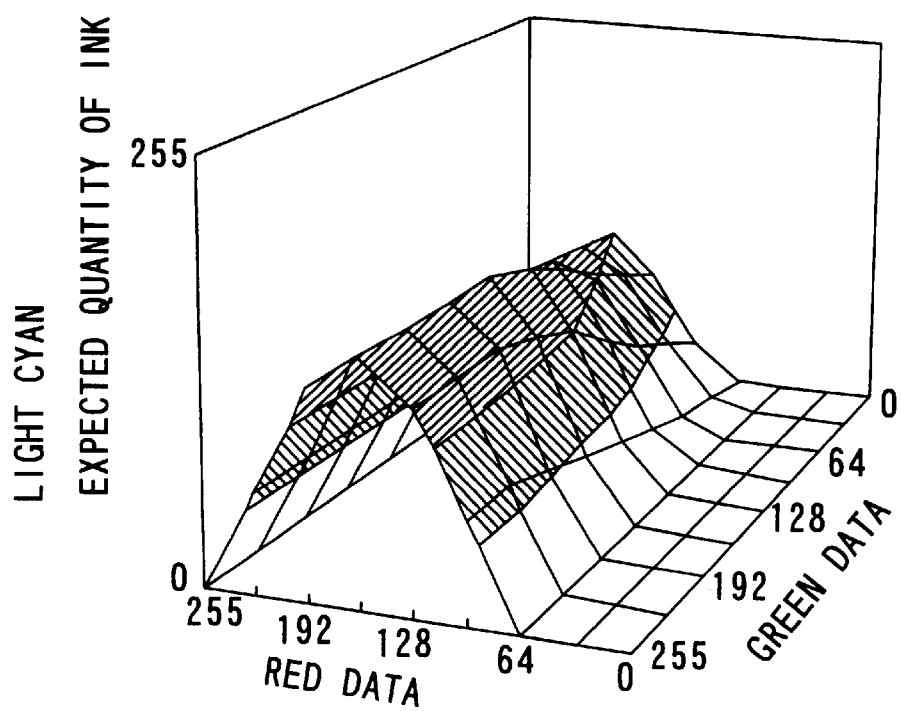
FIG. 16 is a table for specifying the expected quantities of light cyan ink in the first routine of FIG. 14.

FIGS. 15 and 16 show examples of the table of expected values IT used in this embodiment. The table of FIG. 15 gives the expected values of cyan ink according to the tone values of red and green included in the input pixel tone data. The table of FIG. 16 gives the expected values of light cyan ink in the same format. For convenience of illustration, the tone value of blue (blue data) is set to a fixed value in the examples of FIGS. 15 and 16. In the actual state, there are 256 graphs like FIG. 15 or FIG. 16 according to a change in blue data. Although FIGS. 15 and 16 are illustrated in the form of the graphs, data corresponding to all the combinations of the tone values of blue, red, and green (256×256× 256) are actually stored in the form of a table into the memory of the computer 90. The expected quantities of inks shown in FIGS. 15 and 16 are set to prevent the sum of the expected values from exceeding the restriction of the ink duty of printing paper, by taking into account the expected values of not only cyan ink and light cyan ink but magenta ink and other color inks. The tables like FIGS. 15 and 16 are preset for the other color inks.

The table of expected values IT may be supplied from a CD-ROM or any other recording medium via or not via a network and stored into the memory of the computer 90. The table of expected values IT may be supplied alone or together with other tables and programs.

As discussed above, the CPU reads the data corresponding to the input pixel tone data from the table of expected values IT and thereby determines the expected quantity of ink at step S210. After the processing is carried out for all the colors at step S215, the program returns from the routine of determining the expected quantities of inks to be spouted to the dot creation routine.

Since the data regarding the expected quantities of inks to be spouted are stored corresponding to all the combinations of tone data in the form of a table, the process of determining the expected quantities of inks to be spouted is very simple and thus enables the high-speed processing. This arrangement facilitates application of even non-linear data regarding the expected quantities of inks to be spouted.

In the above embodiment, the process of determining the expected quantities of inks to be spouted for the respective colors is concluded for each pixel. One possible modification may repeat the processing for each raster line or a whole image while storing the results of the processing for the respective pixels into the memory.

In the above embodiment, the processing is carried out separately for each color. One possible modification may provide a table for collectively storing expected quantities of inks for the respective colors corresponding to the input data, in place of the tables for separately storing expected quantities of ink for each color, so as to enable the expected quantities of inks to be set simultaneously for all the colors.

Figure 17:
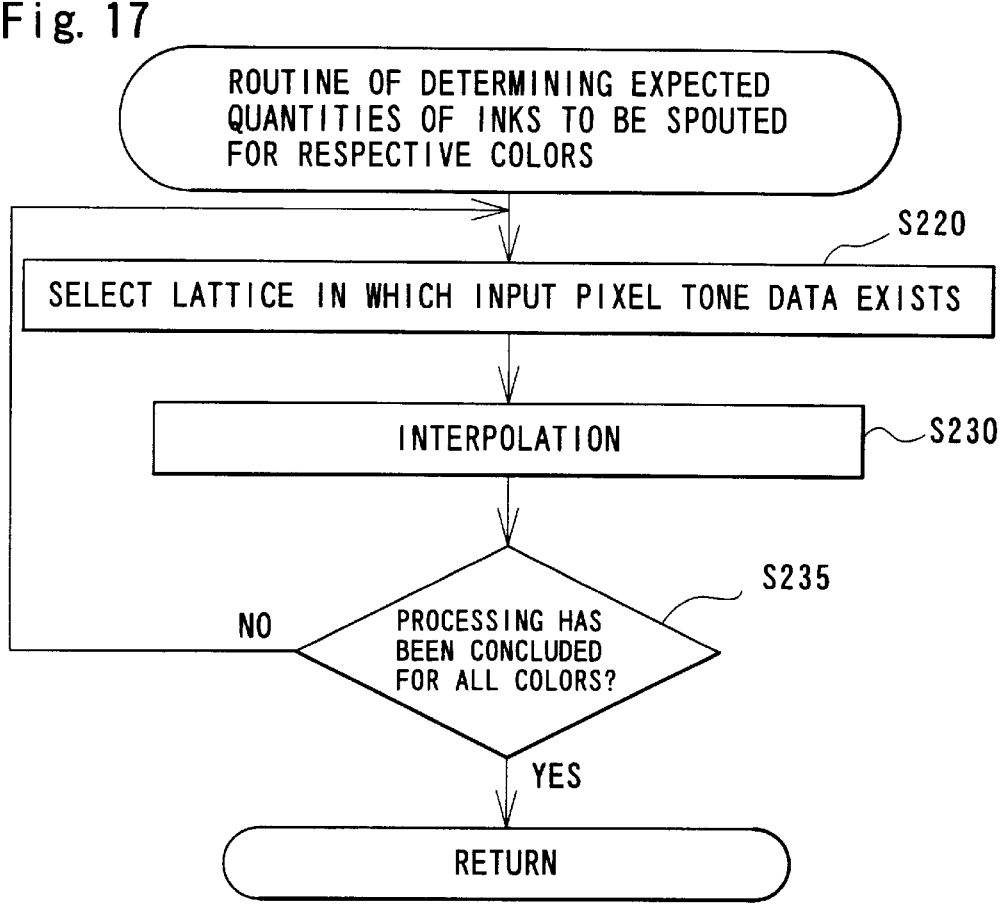
FIG. 17 is a flowchart showing a second routine of determining the expected quantities of inks to be spouted for the respective colors.

A second procedure of determining the expected quantities of inks to be spouted for the respective colors is discussed with the flowchart of FIG. 17. The second procedure reduces the number of data included in the tables of expected values IT as shown in FIGS. 15 and 16 and carries out interpolation according to the requirements to determine the expected quantities of inks to be spouted. In the second procedure, each table of expected values IT that gives the expected quantities of ink does not store the data corresponding to all the combinations of blue data, red data, and green data (see FIGS. 15 and 16), but stores the data corresponding to only specific lattice points.

When the program enters the routine of determining the expected quantities of inks to be spouted, the CPU first selects a lattice in which the input pixel tone data exists at step S220. Since the table of expected values IT in the second procedure has the data corresponding to only specific lattice points, the required data or the expected quantity of ink corresponding to the input pixel tone data may not exist in the table IT. The CPU accordingly selects a lattice, in which the input pixel tone data exists, for the subsequent interpolation.

Figure 18:
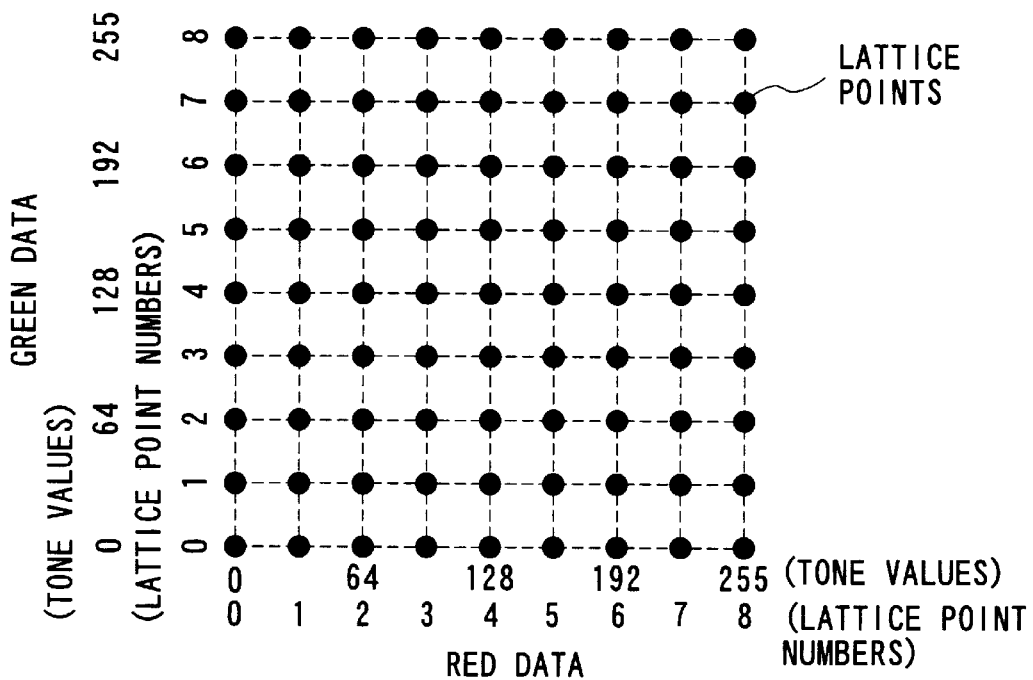
FIG. 18 is a table for specifying the expected quantities of ink in the second routine of FIG. 17.

The lattices are explained concretely with the drawing of FIG. 18. FIG. 18 shows lattice points defined by red data and green data. Like the tables of FIGS. 15 and 16, for convenience of illustration, the blue data is set to a fixed value in the example of FIG. 18. As described previously, both the red data and the green data may take 256 tones in the range of 0 to 255. In the plane of FIG. 18 with a fixed tone value of blue, there should be 256×256 pixel data expressed by the combinations of red data and blue data. The first procedure discussed above stores the data regarding the expected quantities of ink corresponding to all these combinations.

The second procedure, on the other hand, equally divides the tone values of 0 to 255 into eight lattices for both the red data and the green data as shown in FIG. 18 and stores the expected quantities of ink only corresponding to lattice points or intersections of the lattices. By way of example, although the tone value '63' is possible as the pixel tone data, the table of expected values IT does not include the data corresponding to the tone value '63'.

In this embodiment, lattice points exist at the intervals of 32 tone values as shown in FIG. 18. Numbers 0, 1, 2, . . . , 8 are assigned to these lattice points in the sequence of the tone value '0' to the tone value '255' These numbers are hereinafter referred to as the lattice point numbers. A concrete procedure of this embodiment divides the respective values of red data and green data by 32 and raises the decimals to whole numbers, thereby specifying a lattice in which the input pixel tone data exists. For example, in the case of the tone value '63', the result of the calculation is equal to 2, so that the input pixel tone data is determined to be present in a lattice defined by the lattice point number 2 and the lattice point number 3. Although the lattice points are arranged at equal intervals in this embodiment, it is not required to arrange the lattice points at equal intervals nor required to have the same intervals set for the red data and the green data. A lattice in which the input pixel tone data exists is also selected for blue in the same manner as the above technique for selecting the lattice for red and green. The procedure thus actually selects a rectangular parallelepiped, in which the input pixel tone data exists, out of the three-dimensional color space of blue, red, and green.

After selecting the lattice (rectangular parallelepiped) in which the input pixel tone data exists, the process carries out interpolation with lattice points of the selected lattice, in order to determine the expected quantity of ink corresponding to the input pixel tone data at step S230. There are eight lattice points defining one lattice or rectangular parallelepiped. A variety of known techniques may be applied to carry out interpolation with the data at the eight lattice points, although not specifically described here.

When the process of determining the expected quantity of ink to be spouted by interpolation has been concluded for all the colors at step S235, the program returns from the routine of determining expected quantities of inks to be spouted to the dot creation routine.

The second procedure requires the interpolation and thereby has the lower processing speed than that of the first procedure. The second procedure, however, has the smaller amount of data in the respective tables of expected values IT and thereby saves the required quantity of memory.

The process of setting the expected quantities of inks is similar to the known color correction process, which also gives a set of data regarding the respective colors, such as cyan and light cyan, based on a set of input data consisting of three colors, blue, red, and green. A variety of techniques used for the color correction, other than the two procedures discussed above, may also be adopted in this process. The above procedures use the tables of expected values IT, in which data regarding the expected quantities of inks are stored. In the event that the data of expected values are expressed as a specific function of the pixel tone data, the expected quantities of inks may be determined according to this function.

(4) Process of Setting Dot Diameter

A variety of techniques are also applicable to the process of setting the diameters of the dots to be created, based on the expected quantities of inks determined according to the process of determining the expected quantities of inks. Three possible applications are successively described below as examples of the process of setting the dot diameter. Any of these applications may be adopted irrespective of the procedure applied to determine the expected quantities of inks. In the event that the dot diameter is varied continuously, the dot diameter can be set to make the expected quantity of ink coincident with the quantity of ink actually spouted. The structure of the embodiment, however, may create only the limited number of dot diameters. Namely there is an error or a difference between the expected quantity of ink and the quantity of ink actually spouted for each pixel. This embodiment adopts one of the procedures discussed below and selects the diameter of the dot to be created in each pixel, in order to reduce the sum of such errors in a whole printed image.

Figure 19:
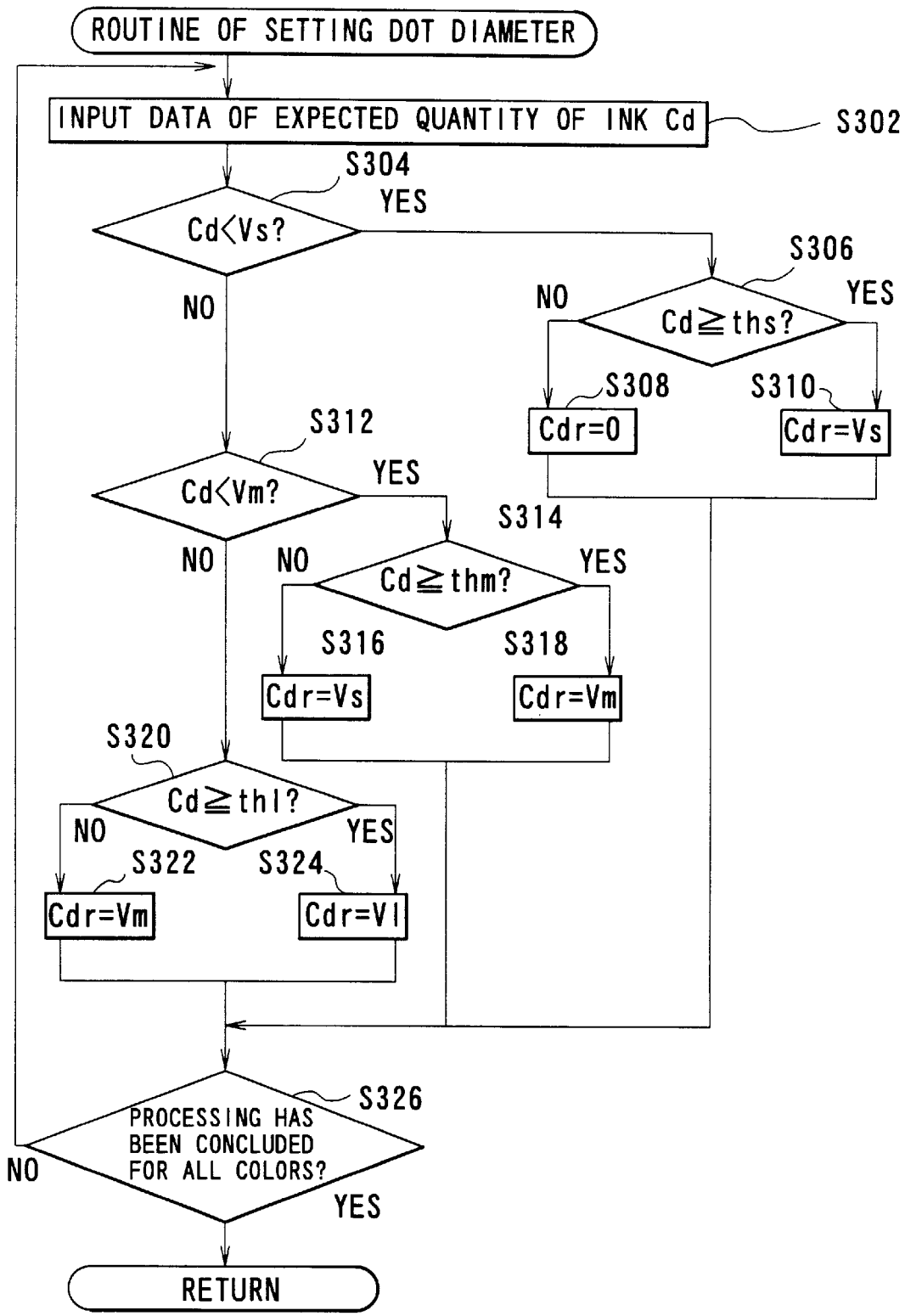
FIG. 19 is a flowchart showing a first routine of setting the dot diameter.

A first procedure of setting the dot diameter is discussed with the flowchart of FIG. 19. The description regards an example, in which the expected quantity of cyan ink is set to a value Cd.

When the program enters the routine of setting the dot diameter shown in FIG. 19, the CPU first inputs data of expected quantity of ink Cd at step S302. The data of expected quantity of ink Cd represent the expected quantities of ink to be spouted per unit area, which have been determined according to the process of determining the expected quantities of inks discussed above.

The data of expected quantity of ink Cd are then compared with a preset value Vs at step S304. The preset value Vs represents a quantity of ink that is supposed to be spouted for creating a dot having the smallest dot diameter (hereinafter referred to as the small dot). The quantity of ink to be spouted for creating the small dot is hereinafter referred to as the small dot ink quantity. In the case where the data of expected quantity of ink Cd are determined to be smaller than the preset value Vs at step S304, the program proceeds to step S306 to compare the data of expected quantity of ink Cd with a threshold value ths with respect to each pixel, in order to determine whether a small dot is to be created or not in the pixel. In the event that the data of expected quantity of ink Cd is less than the threshold value ths with respect to a certain pixel, the program determines no creation of the small dot in the certain pixel and sets a value '0' to dot diameter data Cdr with respect to the certain pixel at step S308. In the event that the data of expected quantity of ink Cd is not less than the threshold value ths with respect to a certain pixel, on the other hand, the program determines creation of the small dot in the certain pixel and sets a value Vs, which corresponds to the small dot ink quantity, to the dot diameter data Cdr with respect to the certain pixel at step S310.

The preset value Vs used for the comparison at step S304 may be identical with or different from the value Vs set to the dot diameter data Cdr at step S310, as long as both the values Vs correspond to the small dot ink quantity, that is, the quantity of ink to be spouted for creating the small dot. By way of example, the value Vs set to the dot diameter data Cdr at step S310, that is, the value actually used to create a dot, may be less than the preset value Vs used for the comparison at step S304. This arrangement enables the restriction of the ink duty to be kept even when there is some scatter in quantity of ink actually spouted from the respective nozzles.

The threshold values ths used in the routine is described here. This embodiment uses a threshold matrix of discrete dither to set the threshold values ths. The details of the dither method will be discussed later. This embodiment specifically uses a global matrix or blue noise matrix of 64×64 in size and adopts the systematic dither method. This 64×64 dither matrix gives the threshold values in such a manner that there is no significant polarization in appearance of the threshold values (0 to 255) in any 16×16 area included in the 64×64 matrix.

Since the data of expected quantity of ink Cd may take the values in the range of 0 to Vs, the threshold values ths used for the comparison at step S306 are obtained by normalizing the dither matrix in the range of 0 to Vs. Namely the respective elements th included in the 64×64 dither matrix are converted by an equation given below into the threshold values ths in the range of 0 to Vs:

$$ths = th \times Vs/255$$

Figure 20:
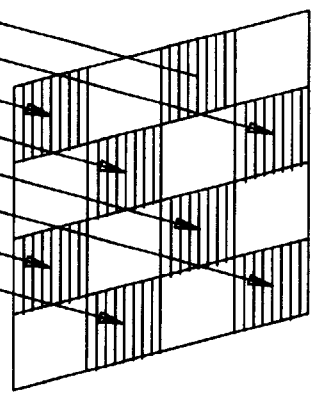
FIG. 20 shows a method of determining the on-off state of dots with a dither matrix.

The dither method is described with the drawing of FIG. 20. In the example of FIG. 20, it is assumed that the preset value Vs is equal to 64 and that the data of expected quantity of ink Cd are smaller than the preset value Vs in a specific area consisting of 4×4 pixels. The threshold values ths in the specific 4×4 area are given by normalizing the dither matrix and may take the values in the range of 0 to 64 as shown in FIG. 20. Comparison between the threshold value ths with the data of expected quantity of ink Cd with respect to each pixel determines the on-off state of the small dot in the pixel as shown in FIG. 20. As discussed previously, the dither matrix is set to ensure the appearance of threshold values with no polarization. When the dither method is applied to determine the on-off state of the small dot, the existing difference between the expected quantity of ink and the quantity of ink actually spouted with respect to each pixel may become insignificant in the image as a whole.

In the case where the data of expected quantity of ink Cd are determined to be not smaller than the preset value Vs at step S304, the program proceeds to step S312 to compare the data of expected quantity of ink Cd with another preset value Vm. The preset value Vm represents a quantity of ink that is supposed to be spouted for creating a dot having the intermediate dot diameter (hereinafter referred to as the medium dot). The quantity of ink to be spouted for creating the medium dot is hereinafter referred to as the medium dot ink quantity. When the data of expected quantity of ink Cd are determined to be smaller than the preset value Vm at step S312, the program then compares the data of expected quantity of ink Cd with a predetermined threshold value thm with respect to each pixel at step S314. In the event that the data of expected quantity of ink Cd is less than the predetermined threshold value thm with respect to a certain pixel, the program determines no creation of a medium dot but creation of a small dot in the certain pixel and sets the value Vs, which corresponds to the small dot ink quantity, to the dot diameter data Cdr with respect to the certain pixel at step S316. In the event that the data of expected quantity of ink Cd is not less than the predetermined threshold value thm with respect to a certain pixel, on the other hand, the program determines creation of a medium dot in the certain pixel and sets the value Vm, which corresponds to the medium dot ink quantity, to the dot diameter data Cdr with respect to the certain pixel at step S318. In this procedure, when the data of expected quantity of ink Cd is less than the threshold value tbm with respect to one pixel, no medium dot but a small dot is to be created in the pixel. This is because no creation of dot undesirably increases the difference between the expected quantity of ink and the quantity of ink actually spouted.

The threshold values thm are set with the dither matrix discussed previously. Since the data of expected quantity of ink Cd may take the values in the range of Vs to Vm, the threshold values thm used for the comparison at step S314 are obtained by normalizing the respective elements th included in the dither matrix in the range of Vs to Vm according to an equation given below.

$$thm=th\times(Vm-Vs)/255+Vs$$

In the case where the data of expected quantity of ink Cd are determined to be not smaller than the preset value Vm at step S312, the program subsequently determines an on-off state of a dot having the greatest dot diameter (hereinafter referred to as the large dot) with respect to each pixel. The program accordingly proceeds to step S320 to compare the data of expected quantity of ink Cd with a predetermined threshold value thl with respect to each pixel. In the event that the data of expected quantity of ink Cd is less than the predetermined threshold value thl with respect to a certain pixel, the program determines no creation of a large dot but creation of a medium dot in the certain pixel and sets the value Vm, which corresponds to the medium dot ink quantity, to the dot diameter data Cdr with respect to the certain pixel at step S322. In the event that the data of expected quantity of ink Cd is not less than the predetermined threshold value thl with respect to a certain pixel, on the other hand, the program determines creation of a large dot in the certain pixel and sets a preset value Vl to the dot diameter data Cdr with respect to the certain pixel at step S324. The preset value Vl represents a quantity of ink that is supposed to be spouted for creating the large dot (hereinafter referred to as the large dot ink quantity).

The threshold values thl are set with the dither matrix discussed previously. Since the data of expected quantity of ink Cd may take the values in the range of Vm to Vl, the threshold values thl used for the comparison at step S320 are obtained by normalizing the respective elements th included in the dither matrix in the range of Vm to Vl according to an equation given below.

$$thl=th\times(Vl-Vm)/255+Vm$$

The above procedure determines creation or non-creation of dots and sets the diameters of the respective dots to be created. When the processing has been concluded for all the colors at step S326, the program exits from this routine of setting the dot diameter.

This procedure enables the dots having the required dot diameters to be created appropriately according to the expected quantities of inks. As discussed previously, the use of the dither matrix effectively prevents a local polarization of dots and reduces the difference between the expected quantity of ink and the quantity of ink actually spouted in the image as a whole.

Although the threshold values ths, thm, and thl are set according to the dither matrix in the above procedure, these threshold value may be set according to random numbers produced for the respective pixels.

Figure 22:
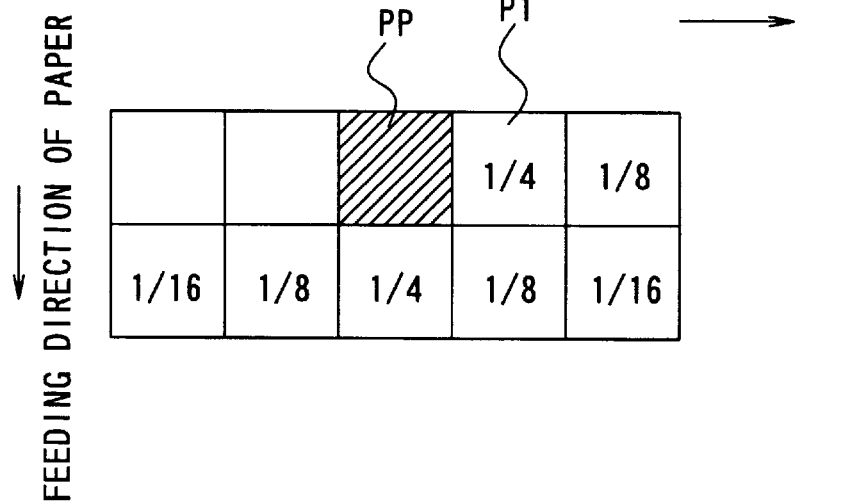
FIG. 22 shows an example of weights used in the error diffusion process.
Figure 21:
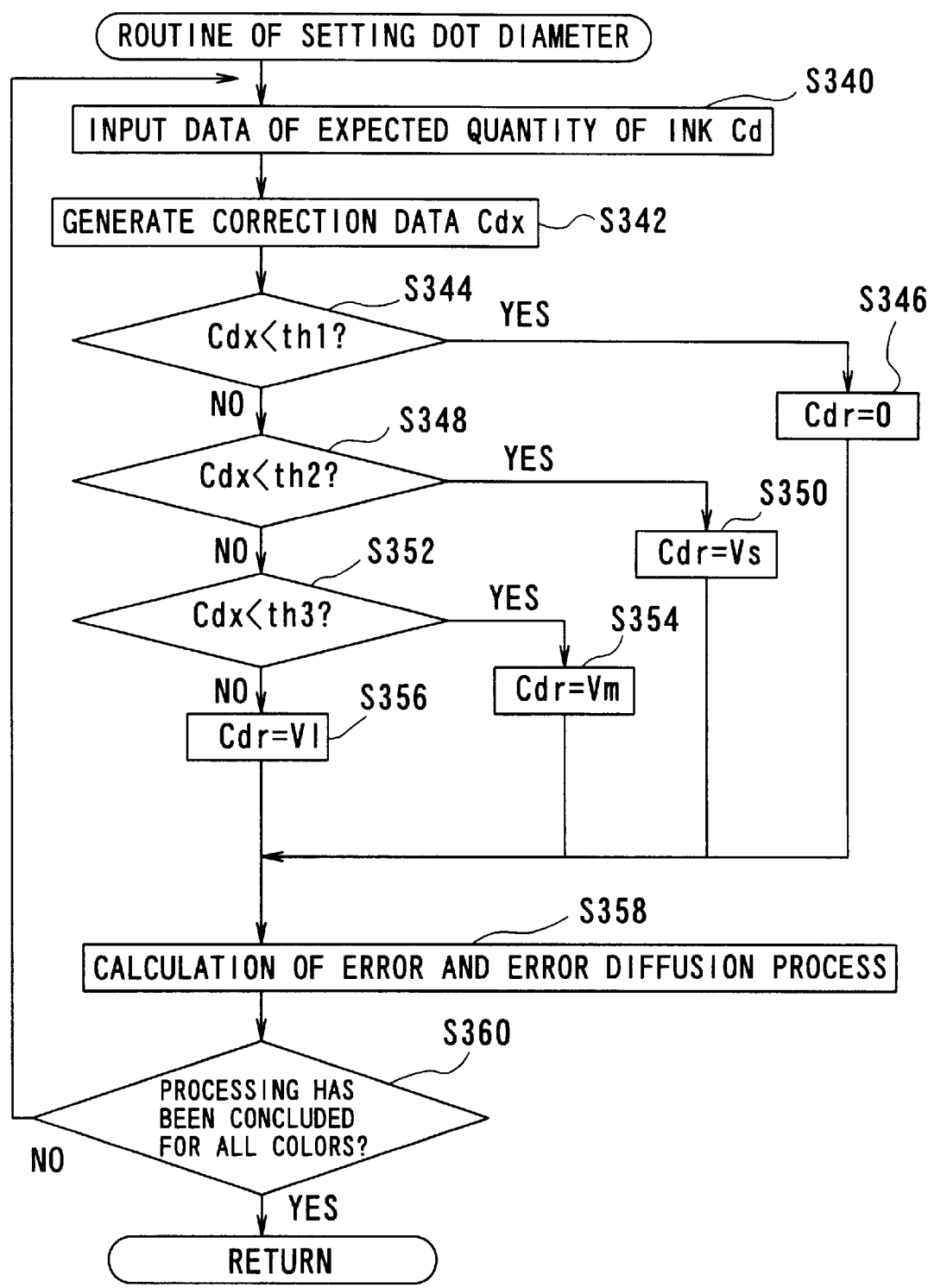
FIG. 21 is a flowchart showing a second routine of setting the dot diameter.

A second procedure of setting the dot diameter is discussed with the flowchart of FIG. 21. When the program enters the routine of setting the dot diameter shown in FIG. 21, the CPU first inputs data of expected quantity of ink Cd at step S340 and makes errors diffused from peripheral pixels, which have already been processed, reflect on the input data of expected quantity of ink Cd to generate correction data Cdx at step S342. The second procedure applies the error diffusion method to make the quantity of ink actually spouted close to the data of expected quantity of ink Cd as discussed below. The error diffusion method distributes an error of ink quantity occurring in a certain processed pixel into peripheral pixels in the vicinity of the processed pixel with predetermined weights. The concrete process of step S342 reads the errors that have been distributed into a target pixel, which is being currently processed, and makes the errors reflect on the target pixel. The table of FIG. 22 shows weights of error diffusion, with which an error occurring in a target pixel PP is distributed into the peripheral pixels in the vicinity of the target pixel PP. In the example of FIG. 22, the density error occurring in the target pixel PP is distributed into several peripheral pixels both in the scanning direction of the carriage 31 and in the feeding direction of the printing paper P with predetermined weights of ¼, ⅛, and 1/16. The details of the error diffusion process will be discussed later.

The CPU successively compares the correction data Cdx with predetermined threshold values thl through th3 at steps S344 through S352. The predetermined threshold values th1, th2, and th3 satisfy the relation of thl<th2<th3. In the event that the correction data Cdx is smaller than the threshold value thl at step S344, the program determines no creation of dot and sets a value '0' to the dot diameter data Cdr at step S346. When the correction data Cdx is not smaller than the threshold value thl but is smaller than the threshold value th2 at step S348, the program determines creation of a small dot and sets the value Vs corresponding to the small dot ink quantity to the dot diameter data Cdr at step S350. When the correction data Cdx is not smaller than the threshold value th2 but is smaller than the threshold value th3 at step S352, the program determines creation of a medium dot and sets the value Vm corresponding to the medium dot ink quantity to the dot diameter data Cdr at step S354. In the event that the correction data Cdx is not smaller than the threshold value th3 at step S352, the program determines creation of a large dot and sets the value Vl corresponding to the large dot ink quantity to the dot diameter data Cdr at step S356.

The above procedure determines creation or non-creation of dots and sets the diameters of the respective dots to be created. The CPU carries out calculation of an error ERR and the error diffusion process, based on the settings at step S358. The error ERR represents a difference between the correction data Cdx generated at step S342 and the dot diameter data Cdr, which represents the quantity of ink actually spouted. While the correction data Cdx may continuously take the values in the range of 0 to 255, the dot diameter data Cdr may take only specific discrete values. The error is ascribed to such difference. By way of example, a large dot may be created when the correction data Cdx is equal to 199, while the large dot ink quantity Vl is equal to 255. There is accordingly an error in ink quantity specified as 255−199=56. This means that the quantity of ink actually spouted is greater than the expected quantity of ink. The error ERR is thus obtained according to the equation of ERR=Cdr−Cdx.

The error diffusion process distributes the error thus obtained with respect to the target pixel PP, which is being currently processed, into the peripheral pixels in the vicinity of the target pixel PP with the predetermined weights (see the table of FIG. 22). Since the error should be distributed only into non-processed pixels, the peripheral pixels to which the error is distributed are the pixels arranged after the target pixel PP in the scanning direction of the carriage 31 or in the feeding direction of the printing paper P as shown in FIG. 22. In the above example, when the error ERR obtained for the target pixel PP, which is being currently processed, is equal to 56, the value '14', which is ¼ of the error ERR=56, is distributed into a pixel P1 adjacent to the target pixel PP. The division of the error '14' is made to reflect on the pixel P1 at step S342 in the next cycle of this routine when the pixel P1 is set to a next target pixel. For example, when the data of expected quantity of ink Cd is equal to 214 with respect to the pixel PI, the process subtracts the diffused error '14' from the data Cd to generate the correction data Cdx equal to 200 at step S342. The repeated execution of such processing enables a resulting image to be printed with the quantities of inks, which substantially correspond to the expected quantities of inks as a whole, although each pixel has some error in ink quantity. After the processing for determining creation or non-creation of dots and setting the diameters of the respective dots to be created has been concluded for all the colors at step S360, the program exits from the routine of setting the dot diameter.

The second procedure is more complicated and thereby has a lower processing speed than the first procedure. The second procedure, however, ensures the cancellation of the errors in ink quantity and gives a resulting image of better picture quality. The weights shown in the table of FIG. 22 are only illustrative and not restrictive in any sense, and other values may be set to the predetermined weights.

Figure 23:
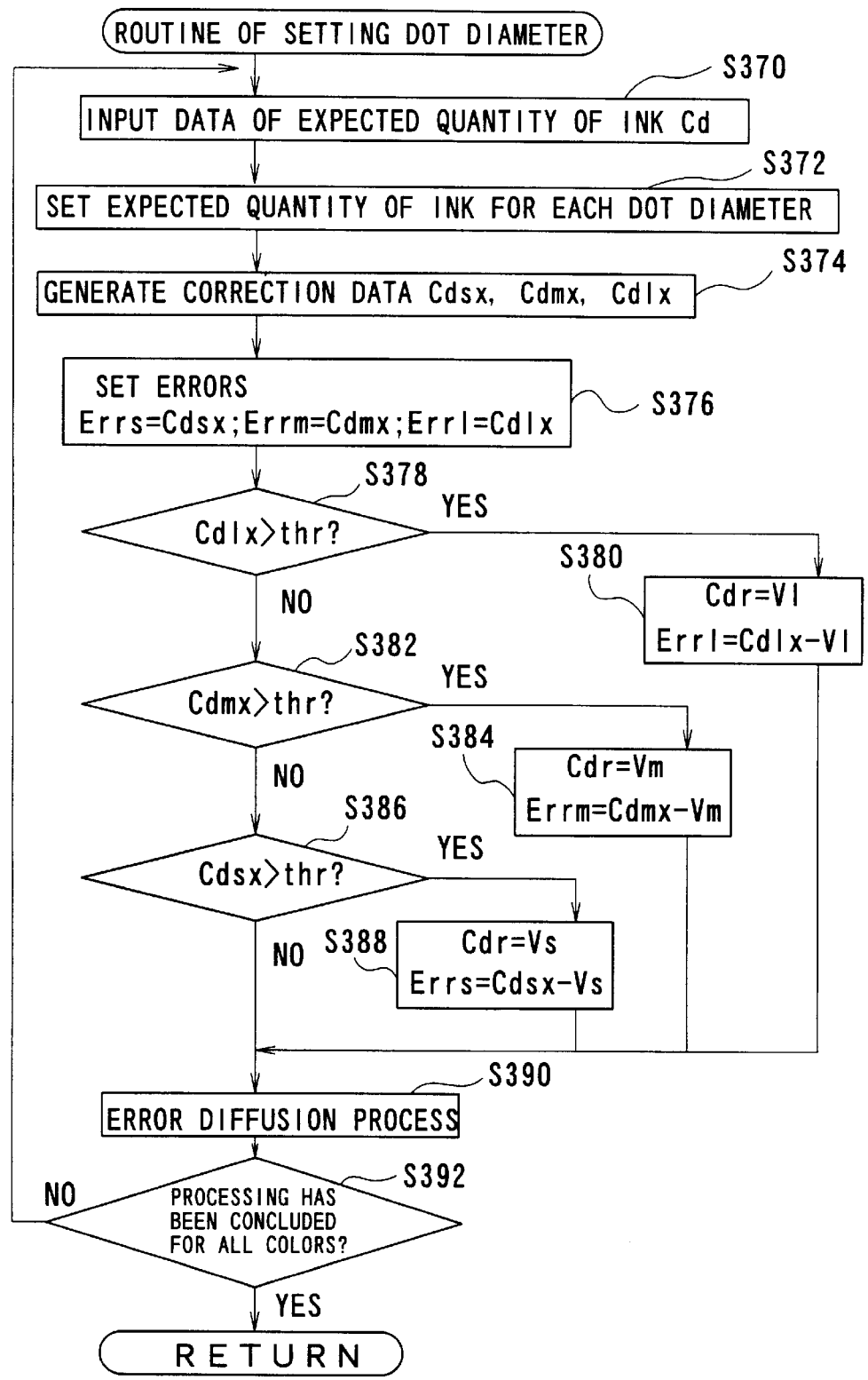
FIG. 23 is a flowchart showing a third routine of setting the dot diameter.

A third procedure of setting the dot diameter is discussed with the flowchart of FIG. 23. The third procedure adopts the error diffusion method like the second procedure. The difference is that the third procedure separately processes the dots of the respective diameters, whereas the second procedure collectively processes the dots of the respective diameters.

Figure 24:
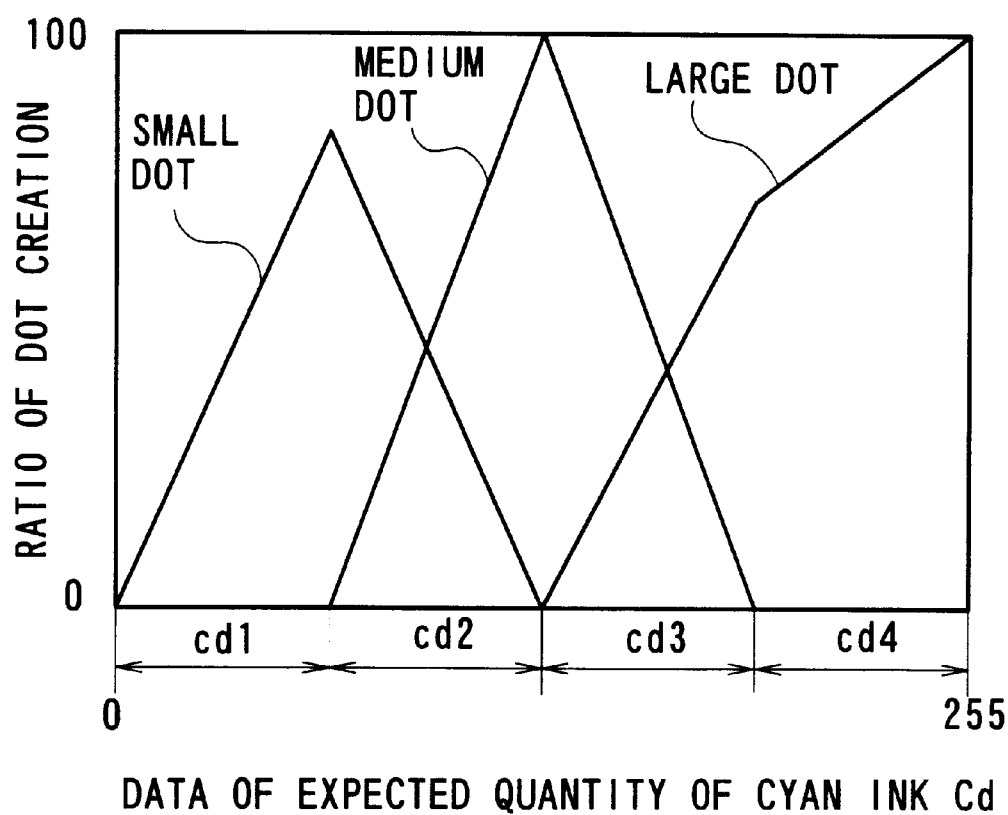
FIG. 24 is a table for specifying the expected values of ink quantity by dot diameters in the third routine of FIG. 23.

When the program enters the routine of setting the dot diameter shown in FIG. 23, the CPU first inputs data of expected quantity of ink Cd at step S370 and sets expected values of ink quantity by dot diameters based on the input data Cd at step S372. The expected values of ink quantity by dot diameters are set by referring to a table provided in advance. An example of the table applicable for this purpose is shown in FIG. 24. The table of FIG. 24 gives the expected values of ink quantity by dot diameters in the form of the ratio of dot creation, based on the input data of expected quantity of ink Cd. The expected value of ink quantity by dot diameter is obtained by multiplying the quantity of ink to be spouted for creating each type of dot having a specific dot diameter by the ratio of dot creation. In the case where the data of expected quantity of ink Cd is relatively small, for example, in a division Cd1, only small dots are to be created. In the division Cd1, the expected values of ink quantity corresponding to the medium dot and the large dot are both equal to zero. In other divisions Cd2, Cd3, and Cd4, the expected values of ink quantity corresponding to the respective dot diameters are set in a similar manner. The expected values of ink quantity corresponding to the small dot, the medium dot, and the large dot set at step S372 are expressed as Cds, Cdm, and Cdl.

The CPU subsequently makes errors diffused from peripheral pixels, which have already been processed, reflect on the expected values of ink quantity by dot diameters, so as to generate correction data Cdsx, Cdmx, and Cdlx at step S374. The expected values of ink quantity Cds, Cdm, and Cdl respectively corresponding to the small dot, the medium dot, and the large dot are separately subjected to the correction by the error diffusion method, so as to give the correction data Cdsx, Cdmx, and Cdlx. In the third procedure, the processing is carried out separately for each dot diameter.

The CPU then sets, as tentative errors, the correction data Cdsx to an error Errs regarding the small dot, the correction data Cdmx to an error Errm regarding the medium dot, and the correction data Cdlx to an error Errl regarding the large dot at step S376. These values correspond to errors on the assumption that the dots of the respective dot diameters are not created in the subsequent processing.

After setting the tentative errors, the CPU compares the correction data Cdlx regarding the large dot with a preset threshold value thr at step S378. In the event that the correction data Cdlx is greater than the preset threshold value thr, the program determines creation of a large dot. The CPU accordingly sets a value Vl to the dot diameter data Cdr and changes the error Errl regarding the large dot from the correction data Cdlx to a difference between the correction data Cdlx and the value Vl at step S380.

In the event that the correction data Cdlx regarding the large dot is not greater than the preset threshold value thr, on the other hand, the program determines no creation of a large dot. The program then proceeds to step S382 to compare the correction data Cdmx regarding the medium dot with the preset threshold value thr. In the event that the correction data Cdmx is greater than the preset threshold value thr, the program determines creation of a medium dot. The CPU accordingly sets a value Vm to the dot diameter data Cdr and changes the error Errm regarding the medium dot from the correction data Cdmx to a difference between the correction data Cdmx and the value Vm at step S384.

In the event that the correction data Cdmx regarding the medium dot is not greater than the preset threshold value thr, on the other hand, the program determines no creation of a medium dot. The program then proceeds to step S386 to compare the correction data Cdsx regarding the small dot with the preset threshold value thr. In the event that the correction data Cdsx is greater than the preset threshold value thr, the program determines creation of a small dot. The CPU accordingly sets a value Vs to the dot diameter data Cdr and changes the error Errs regarding the small dot from the correction data Cdsx to a difference between the correction data Cdsx and the value Vs at step S388. In the event that the correction data Cdsx regarding the small dot is not greater than the preset threshold value thr, on the other hand, the program determines no creation of dot.

The above procedure determines creation and non-creation of dots and sets the diameters of the dots to be created, while setting the errors according to the results of dot creation. The tentative error set at step S376 is kept for the dot that is determined not to be created by the above procedure.

The CPU subsequently carries out the error diffusion process at step S390. The weights multiplied in the process of error diffusion are those used in the second procedure. The third procedure carries out the error diffusion process separately with respect to the errors Errs, Errm, and Errl corresponding to the respective dot diameters. After the above processing has been concluded for all the colors at step S392, the program exits from the routine of setting the dot diameter shown in FIG. 23.

Like the second procedure, the third procedure appropriately cancels the errors in an image as a whole and thereby improves the picture quality of the resulting image. Because of the following reason, the third procedure gives the resulting image of better picture quality than the second procedure. The second procedure collectively carries out the error diffusion process for all the different types of dots having different dot diameters. This may cause a local polarization of the dots having the greatest dot diameter. Such a local polarization occurring in the case of the higher-density ink undesirably enhances the granularity and lowers the picture quality of the resulting image. The third procedure, on the other hand, carries out the error diffusion process separately for the respective dot diameters. This causes the dots having different diameters to be well dispersed in the whole image. There is accordingly little fear of such a local polarization and ensures the good picture quality of the resulting image.

Based on the results of the dot creation routine discussed above, the CPU executes the processing to cause the printer 22 to create the respective dots. There are a variety of known techniques applicable for the processing according to the structure of the printer 22, and the detailed description with a flowchart is thus omitted here. In this embodiment, the large dot, the medium dot, and the small dot can be created arbitrarily with the respective nozzles in the course of one main scan of the carriage 31 as discussed previously. This arrangement readily implements any settings of the diameters of the dots to be created by the above procedure.

Any of the processes of setting the dot diameter is applicable to printers that selectively use three driving waveforms provided respectively for the large dot, the medium dot, and the small dot, that is, printers in which the dots created simultaneously by one nozzle array have a fixed diameter. In such printers, the well-known overlap scanning method is applied to create dots of different diameters. An example of the overlap scanning is described below.

Figure 25:
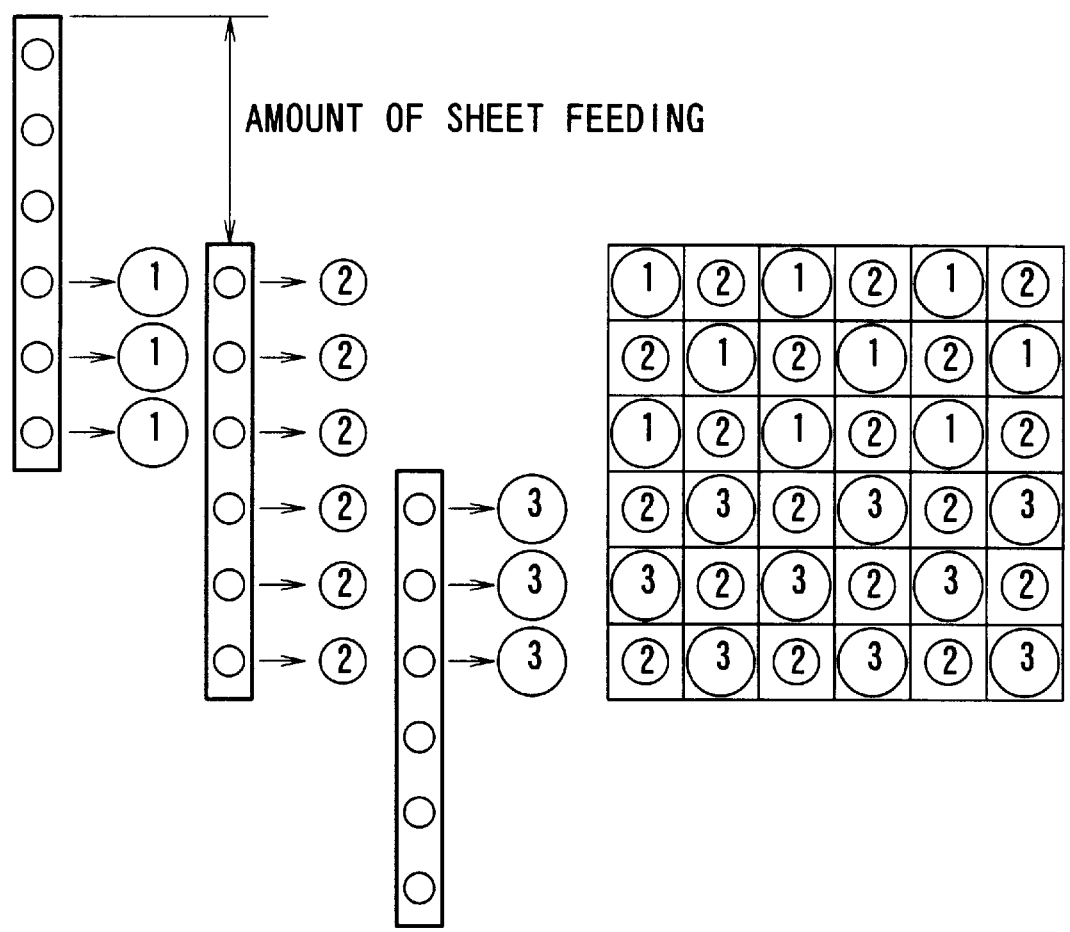
FIG. 25 shows a process of recording large dots with small dots.

FIG. 25 schematically shows an example of the overlap scanning to create both the large dot and the small dot in a 6×6 area with a head including six nozzles. The left-side drawing of FIG. 25 shows the state of spouting ink corresponding to each scan of the head, while the right-side drawing shows the dots actually formed. The numerals assigned to the respective dots represent the sequential number of the head scan. As shown in FIG. 25, the first main scan uses the nozzles in the lower half of the head to create large dots alternately in the main scanning direction. After a first feed of the printing paper by three dots in the sub-scanning direction, the second main scan uses all the nozzles on the head to create small dots alternately in the main scanning direction. After a second feed of the printing paper by three dots in the sub-scanning direction, the third main scan uses the nozzles in the upper half of the head to create large dots alternately in the main scanning direction. This arrangement causes each raster line to be recorded by two main scans, thereby enabling the large dots and the small dots to be created at the rate of 1 to 1.

The printer of the present invention discussed above determines the expected quantities of inks for the respective colors based on the input image data, while keeping the restriction of the ink duty. The printer sets the diameters of the dots to be created in the specific range where the quantity of ink actually spouted does not exceed the expected quantity of ink. This arrangement enables the different types of dots having different densities or different dot diameters to be appropriately created while keeping the restriction of the ink duty. Because of the reason discussed below, the printer prints images of favorable picture quality.

The use of the different types of dots having different diameters has some advantages, that is, enabling the multi-tone expression, making the granularity of dots inconspicuous, and preventing the banding, that is, the unevenness of dot creation due to the mechanical error of the head in the printer 22. For example, a local polarization of large dots having the greatest dot diameter in the case of the higher-density ink undesirably enhances the granularity. In order to prevent the enhanced granularity, it is required to create small dots having the smallest dot diameter with the large dots at an appropriate ratio. The dots of different diameters may be created according to a favorable pattern for each color without considering the effects of the other colors.

If the diameters of the dots to be created are set without considering the restriction of the ink duty, the restriction of the ink duty may result in preventing the dots from being created according to a favorable pattern. The technique of the present invention, however, sets the expected values of ink spouting quantity while keeping the restriction of ink duty, and causes different types of dots having different dot diameters to be created according to a favorable pattern for each color based on the expected values. This arrangement ensures the good picture quality of resulting images.

The technique of the present invention has the other advantages discussed below. A method of increasing the number of ink densities or alternatively a method of increasing the number of dot diameters may be applied to increase the number of different types of dots having different densities per unit area with respect to one hue. The increase in number of ink densities is generally difficult since additional ink cartridges and heads are required. The increase in number of dot diameters is, on the other hand, readily attained by increasing the number of different driving waveforms. Only some modification of the process for separately setting the dot diameters with respect to each color is required to increase the number of dot diameters for a further improvement in tone expression. The arrangement of the present invention is accordingly advantageous for the further enhancement of tone expression in the design of the printer.

The printing system of the illustrated embodiment includes the computer that executes the variety of processes. One possible application of the present invention accordingly a recording medium, in which a program for actualizing the respective functions discussed above is stored. Typical examples of the recording media include flexible disks, CD-ROMs, magneto-optic discs, IC cards, ROM cartridges, punched cards, prints with bar codes or other codes printed thereon, internal storage devices (memories like a RAM and a ROM) and external storage devices of the computer, and a variety of other computer readable media. Still another application of the invention is a program supply apparatus that supplies a computer program, which causes the computer to carry out the respective steps of the method or the functions of the respective means, to the computer via a communications path.

The present invention is not restricted to the above embodiment or its modifications discussed above, but there may be many other modifications, changes, and alterations without departing from the scope or spirit of the main characteristics of the present invention. In the illustrated embodiment, the variety of processes discussed above are executed by the computer 90. In accordance with one alternative application, however, the printer 22 may have the functions for executing such processes and actually carry out the processing. In the above embodiment, the process of setting the dot diameter is common to all the inks. One alternative application carries out different processes for the respective inks or the respective ink densities to determine the on-off state of each dot.

Figure 26:
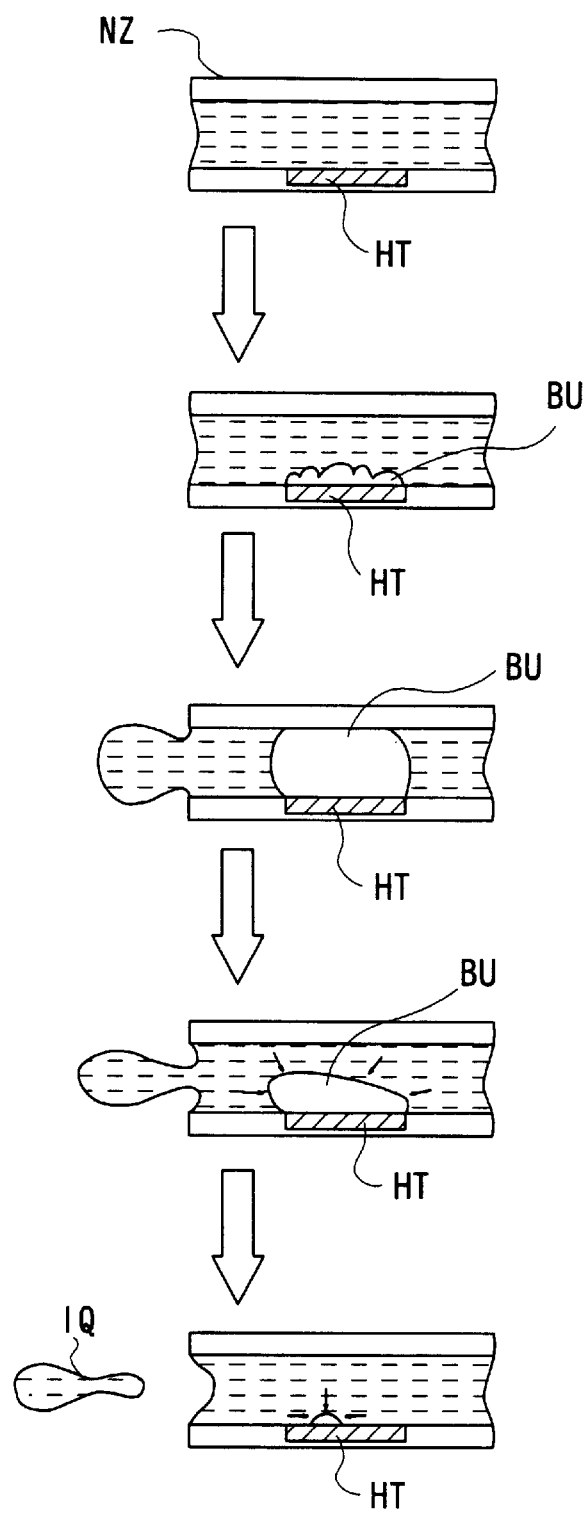
FIG. 26 shows a mechanism for spouting an ink particle with a pressure applied to ink in an ink conduit by bubbles.

In the above embodiment, the printer 22 has the head that uses the piezoelectric elements PE to spout ink as discussed previously. The printer may, however, adopt another technique for spouting ink. One alternative structure of the printer supplies electricity to a heater HT installed in an ink conduit and utilizes the bubbles BU generated in the ink conduit to spout ink IQ as illustrated in FIG. 26. The principle of the present invention is applicable to the printer of this alternative structure since the dots of different diameters can be created by varying the time period for supplying electricity to the heater or the area of supplying the electricity.

It should be clearly understood that the above embodiment is only illustrative and not restrictive in any sense. The scope and spirit of the present invention are limited only by the terms of the appended claims.

What is claimed is:

1. A printer that creates a plurality of dots and thereby prints an image on a printing medium, said printer comprising:
    an input unit that inputs image data for each of pixels included in an original image;
    a head that provides a plurality of inks comprising at least two inks of different densities with respect to at least one hue and enables creation of at least two different types of dots having different quantities of ink for each of the plurality of inks;
    an expected ink quantity setting unit that sets an expected quantity of ink which is to be spouted for creation of a dot in each pixel based on the image data, said expected quantity of ink is determined with respect to each of the plurality of inks,
    a multi-valuing unit that sets an on-off state of each of the at least two different types of dots in each pixel, said on-off state is based on the expected quantity of ink and is determined with respect to each of the plurality of inks; and
    a dot creation unit that creates dots set in the on state.

2. A printer in accordance with claim 1, wherein said expected ink quantity setting unit comprises:
    an expected values storage unit that stores expected quantities of inks corresponding to tone values regarding respective color components of image data in a form of a table; and
    a unit that refers to the table, which is stored in said expected values storage unit, and reads an expected quantity of ink in each pixel corresponding to the input image data.

3. A printer in accordance with claim 2, wherein expected quantities of a given color ink stored in said expected values storage unit are determined by taking into account expected quantities of the other color inks, irrespective of the hue.

4. A printer in accordance with claim 1, wherein said multi-valuing unit applies a dither method.

5. A printer in accordance with claim 1, wherein said multi-valuing unit applies an error diffusion method.

6. A printer in accordance with claim 1, wherein said multi-valuing unit comprises:
    an expected value-by type setting unit that sets an expected value by type, that is, an expected value of ink quantity by each of the at least two different types of dots, which may be created by said head, based on the expected quantity of ink set by said expected ink quantity setting unit; and
    a unit that determines creation or non-creation of a dot in each pixel with respect to each of the at least two different types of dots, based on the expected value by type.

7. A printer in accordance with claim 1, wherein dots created for an identical hue by said head include at least two different types of dots having a substantially identical mean density per unit area at one recording density.

8. A printer in accordance with claim 1, wherein said multi-valuing unit is provided for each of the at least two inks having different ink densities.

9. A printer in accordance with claim 1, wherein said expected ink quantity setting unit sets the expected quantity of ink in a specific range that does not cause a sum of ink quantities spouted per unit area irrespective of the hue to exceed a preset level, which depends upon the printing medium.

10. A printer in accordance with claim 1, wherein said head has a mechanism for spouting an ink particle with a pressure applied to ink in an ink conduit by application of a voltage to a piezoelectric element disposed in said ink conduit.

11. A printer in accordance with claim 1, wherein said head has a mechanism for spouting an ink particle with a pressure applied to ink in an ink conduit by bubbles produced by supply of electricity to a heating element disposed in said ink conduit.

12. A method of creating a plurality of dots and thereby printing an image on a printing medium with a head that provides a plurality of inks, which include at least two inks of different densities with respect to at least one hue, and enables creation of at least two different types of dots having different quantities of ink for each of the plurality of inks, said method comprising the steps of:
    (a) inputting image data for each of pixels included in an original image;
    (b) setting an expected quantity of ink which is to be spouted for creation of a dot in each pixel based on the image data, said expected quantity of ink is determined with respect to each of the plurality of inks;
    (c) setting an on-off state of each of the at least two different types of dots in each pixel, said on-off state is based on the expected quantity of ink and is determined with respect to each of the plurality of inks; and
    (d) creating dots set in the on state.

13. A method in accordance with claim 12, wherein said step (b) refers to a table, in which expected quantities of inks are stored corresponding to tone values regarding respective color components of image data, and reads an expected quantity of ink in each pixel corresponding to the input image data.

14. A method in accordance with claim 12, wherein expected quantities of a given color ink stored in the table are determined by taking into account expected quantities of the other color inks, irrespective of the hue.

15. A method in accordance with claim 12, wherein said step (c) comprises the steps of:
    (c1) setting an expected value by type, that is, an expected value of ink quantity by each of the at least two different types of dots, which may be created by said head, based on the expected quantity of ink set in said step (b); and
    (c2) determining creation or non-creation of a dot in each pixel with respect to each of the at least two different types of dots, based on the expected value by type.

16. A method in accordance with claim 12, wherein said step (b) sets the expected quantity of ink in a specific range that does not cause a sum of ink quantities spouted per unit area irrespective of the hue to exceed a preset level, which depends upon the printing medium.

17. A recording medium, in which a program is recorded in a computer readable manner, said program causing a computer to drive a printer that creates a plurality of dots and thereby prints an image on a printing medium, said program comprising:
    an expected ink quantity setting function that sets an expected quantity of ink which is to be spouted for creation of a dot in each pixel based on input image data, said expected quantity of ink is determined with respect to each of a plurality of inks which include at least two inks of different densities provided for at least one hue; and a multi-valuing function that sets an on-off state of each of at least two different types of dots having different quantities of ink in each pixel, said on-off state is based on the expected quantity of ink and is determined with respect to each of the plurality of inks.

18. A recording medium in accordance with claim 17, wherein expected quantities of inks corresponding to tone values regarding respective color components of image data are stored as expected value data in the form of a table, and said expected ink quantity setting function refers to the expected value data and reads an expected quantity of ink in each pixel corresponding to the input image data.

19. A recording medium in accordance with claim 17, wherein expected quantities of a given color ink stored as the expected value data are determined by taking into account expected quantities of the other color inks, irrespective of the hue.

20. A recording medium in accordance with claim 17, wherein said multi-valuing function comprises the functions of:

setting an expected value by type, that is, an expected value of ink quantity by each of the at least two different types of dots, which may be created by said head, based on the expected quantity of ink set by said expected ink quantity setting function; and determining creation or non-creation of a dot in each pixel with respect to each of the at least two different types of dots, based on the expected value by type.

21. A recording medium in accordance with claim 17, wherein said expected ink quantity setting function sets the expected quantity of ink in a specific range that does not cause a sum of ink quantities spouted per unit area irrespective of the hue to exceed a preset level, which depends upon the printing medium.

22. A recording medium, in which data are recorded in a computer readable manner, said data being used in a program that cases a computer to drive a printer, which creates a plurality of dots and thereby prints an image on a printing medium, said data comprising:

expected value data including an expected quantity of ink which is to be spouted in each pixel based on image data, a plurality of inks including at least two inks of different densities provided for at least one hue said expected value data being stored as first expected values corresponding to tone values regarding respective color components of the image data; and expected value-by type data comprising expected values of ink quantity by each of at least two different types of dots capable of being created by a head in said printer, said expected value-by type data being stored as second expected values corresponding to the first expected values.

23. A recording medium in accordance with claim 22, wherein the first expected values are determined in a specific range that does not cause a sum of ink quantities spouted per unit area irrespective of the hue to exceed a preset level, which depends upon the printing medium.

24. A printer device for creating images, said printer device comprising: means for inputting image data related to each of the pixels;

means for providing a plurality of inks comprising as least two inks of different densities with respect to at least one hue and enabling creation of at least two different types of dots having different quantities of ink for each of said pluralities of inks;

means for setting an expected ink quantity capable of being spouted to create at least one dot in each pixel, said expected quantity of ink based on said image data, said expected quantity of ink is determined with respect to each of said plurality of inks;

means for setting an on-off state of each of said at least two dots in each pixel, said on-off state is based on expected quantities of ink and is determined with respect to each of said plurality of inks; and means for creating dots set in the on state.

* * * * *